US006315275B1

(12) United States Patent
Zysman

(10) Patent No.: US 6,315,275 B1
(45) Date of Patent: Nov. 13, 2001

(54) POCKET SPRING ASSEMBLY AND METHODS

(75) Inventor: Milton Zysman, Toronto (CA)

(73) Assignee: Furniture Row Technologies, LLC, Lakewood, CO (US)

( * ) Notice: Subject to any disclaimer, the term of this patent is extended or adjusted under 35 U.S.C. 154(b) by 0 days.

(21) Appl. No.: 09/273,394

(22) Filed: Mar. 22, 1999

Related U.S. Application Data

(63) Continuation-in-part of application No. 08/995,857, filed on Dec. 22, 1997, now Pat. No. 6,029,957, which is a continuation-in-part of application No. 08/500,904, filed on Sep. 18, 1995, now Pat. No. 5,699,998.

(51) Int. Cl.[7] .................................................. F16F 3/00
(52) U.S. Cl. ........................................ 267/89; 5/655.8
(58) Field of Search ............................ 267/89, 91, 93, 267/94; 53/114, 115, 527; 5/655.7, 655.8

(56) References Cited

U.S. PATENT DOCUMENTS

| | | | |
|---|---|---|---|
| 685,160 | 10/1901 | Marshall . | |
| 698,529 | 4/1902 | Marshall . | |
| 1,247,971 | 11/1917 | Krakauer . | |
| 1,253,272 | 1/1918 | Nachman . | |
| 1,270,840 | 7/1918 | Kelly . | |
| 1,284,384 | 11/1918 | Lewis . | |
| 1,287,663 | 12/1918 | Foster . | |
| 1,313,234 | 8/1919 | Jones . | |
| 1,370,533 | 3/1921 | Genge . | |
| 1,406,051 | 2/1922 | Krakauer . | |
| 1,445,416 | 2/1923 | Shields . | |
| 1,455,847 | 5/1923 | Meutsch . | |
| 1,465,766 | 8/1923 | Krakauer . | |
| 1,466,617 | 8/1923 | Foster . | |
| 1,560,588 | 11/1925 | Lewis . | |
| 1,685,851 | 10/1928 | MacInerney . | |
| 1,720,480 | 7/1929 | Karpen . | |
| 1,724,681 | 8/1929 | Roseman . | |
| 1,733,660 | 10/1929 | Gail . | |
| 1,759,050 | 5/1930 | Gail . | |
| 1,813,993 | 7/1931 | Gail . | |
| 1,861,429 | 5/1932 | Schneider et al. . | |
| 1,867,872 | 7/1932 | Bronstien . | |
| 1,950,186 | 3/1934 | Lofman | 226/18 |
| 2,032,510 | 3/1936 | Spohl | 226/18 |
| 2,048,979 | 7/1936 | Trotta et al. | 5/353 |
| 2,276,282 | 3/1942 | Bindszus | 93/3 |
| 2,320,153 | 5/1943 | Moske | 155/179 |
| 2,359,003 | 9/1944 | Sawyer | 155/179 |
| 2,430,098 | 11/1947 | Binch | 5/353 |
| 2,615,180 | 10/1952 | Woller | 5/353 |
| 2,647,671 | 8/1953 | McInerney | 226/18 |
| 2,747,346 | 5/1956 | Tigerman et al. | 53/28 |
| 2,862,214 | 12/1958 | Thompson et al. | 5/353 |
| 2,934,219 | 4/1960 | Stumpf | 214/1 |

(List continued on next page.)

FOREIGN PATENT DOCUMENTS

| | | |
|---|---|---|
| 176699 | 7/1935 | (CH) . |
| 29 05 096 | 6/1980 | (DE) . |
| 0 155 158 | 9/1985 | (EP) . |
| 655328 | 4/1929 | (FR) . |
| 373813 | 6/1932 | (GB) . |
| WO 91/05732 | 5/1991 | (WO) . |
| WO 94/18116 | 8/1994 | (WO) . |
| WO 98/11015 | 3/1998 | (WO) . |

*Primary Examiner*—Robert J. Oberleitner
*Assistant Examiner*—Pamela J. Rodriguez
(74) *Attorney, Agent, or Firm*—Townsend and Townsend and Crew LLP

(57) ABSTRACT

An exemplary pocket spring assembly comprises a plurality of elongate fabric tubes disposed adjacent each other. Each fabric tube has a plurality of pockets, with at least some of the pockets of adjacent fabric tubes being welded together at midpoints on the adjacent pocket. Further, a spring is disposed in each of the pockets.

8 Claims, 26 Drawing Sheets

U.S. PATENT DOCUMENTS

| | | | |
|---|---|---|---|
| 2,951,322 | 9/1960 | Wood | 53/28 |
| 2,983,236 | 5/1961 | Thompson | 112/2 |
| 3,046,574 | 7/1962 | Erenberg et al. | 5/351 |
| 3,099,021 | 7/1963 | Wetzler | 5/353 |
| 3,168,792 | 2/1965 | Stumpf | 29/433 |
| 3,193,136 | 7/1965 | Stumpf et al. | 221/40 |
| 3,230,558 | 1/1966 | Duncan | 5/353 |
| 3,417,544 | 12/1968 | Grevich | 53/180 |
| 3,462,779 | 8/1969 | Thompson | 5/353 |
| 3,513,629 | 5/1970 | Hoagland et al. | 53/182 |
| 3,633,228 | 1/1972 | Zysman | 5/353 |
| 3,668,816 | 6/1972 | Thompson | 53/28 |
| 3,789,495 | 2/1974 | Stumpf | 29/429 |
| 3,869,739 | 3/1975 | Klein | 5/353 |
| 4,234,983 | 11/1980 | Stumpf | 5/477 |
| 4,234,984 | 11/1980 | Stumpf | 5/477 |
| 4,381,637 | 5/1983 | Ballestrazzi et al. | 53/51 |
| 4,401,501 | 8/1983 | Stumpf | 156/367 |
| 4,439,977 | 4/1984 | Stumpf | 53/428 |
| 4,451,946 | 6/1984 | Stumpf | 5/477 |
| 4,485,506 | 12/1984 | Stumpf et al. | 5/477 |
| 4,491,491 | 1/1985 | Stumpf | 156/73.3 |
| 4,523,344 | 6/1985 | Stumpf et al. | 5/477 |
| 4,565,046 | 1/1986 | Stumpf | 53/114 |
| 4,566,926 | 1/1986 | Stumpf | 156/165 |
| 4,578,834 | 4/1986 | Stumpf | 5/477 |
| 4,679,266 | 7/1987 | Kraft | 5/464 |
| 4,722,168 | 2/1988 | Heaney | 53/450 |
| 4,854,023 | 8/1989 | Stumpf | 29/91 |
| 4,895,352 | 1/1990 | Stumpf | 267/80 |
| 4,986,518 | 1/1991 | Stumpf | 267/91 |
| 5,303,530 | 4/1994 | Rodgers | 53/114 |
| 5,319,815 | 6/1994 | Stumpf et al. | 5/477 |
| 5,699,998 | 12/1997 | Zysman | 267/189 |

POCKET SPRING ASSEMBLY AND METHODS

CROSS REFERENCE TO RELATED APPLICATIONS

This application is a continuation in part application of U.S. patent application Ser. No. 08/995,857, filed Dec. 22, 1997, now U.S. Pat. No. 6,029,957, which is a continuation in part of Ser. No. 08/500,904 filed Sep. 18, 1995 is now U.S. Pat. No. 5,699,998. The complete disclosures of all these references are herein incorporated by reference.

BACKGROUND OF THE INVENTION

This invention relates generally to pocket spring assemblies, and in particular to pocket spring assemblies for use in cushions or mattresses. More specifically, the invention relates to apparatus and methods for efficiently producing pocket spring assemblies having a two-dimensional array of pocketed springs.

Most pocket spring assemblies are constructed of two-dimensional arrays of coil springs contained in individual fabric pockets. Such a construction is often referred to as the Marshall construction, being named after its inventor. Although the Marshall construction has provided a desirable level of cushioning performance for almost a century, its usage has been limited for a variety of reasons, primarily being limited by its high cost of manufacture.

For example, one common way of constructing pocket spring assemblies is by producing strings or linear arrays of pocketed springs which are subsequently joined together to form a two-dimensional array of pocketed springs. U.S. Pat. No. 4,234,983 describes one common way of forming strings of pocketed springs which can then be joined together to form a two-dimensional array of pocketed coils. Similar patents describing methods and apparatus for constructing strings of pocketed coils are U.S. Pat. Nos. 4,854,023 and 4,986,518. The complete disclosures of all these patents are herein incorporated by reference.

U.S. Pat. No. 4,578,834 describes techniques for joining strings of pocket springs to form a two-dimensional array of pocketed springs. In this patent, the strings of pocketed springs are connected to each other by an adhesive that is applied between lines of tangency of adjacent coil springs. A hot melt adhesive applicator transverses a string of pocketed coils, depositing a precise amount of adhesive on each coil jacket. A second string is positioned on the first, and pressure is applied thereto. The applicator then traverses the second string in the same manner as the first. The sequence is repeated until a spring assembly of desired size is created. The complete disclosure of this patent is herein incorporated by reference. U.S. Pat. No. 4,234,984 describes another method for joining adjacent strings of pocketed springs by alternately connecting the interior string of springs to the adjacent string on either side.

In summary, common prior art techniques for forming two-dimensional arrays of pocketed springs include the steps of forming strings of pocketed springs and then joining the strings together. Unfortunately, such a process is time consuming and inefficient, thereby increasing the cost of the pocket spring assembly. Hence, it would be desirable to provide a more efficient way to make a two-dimensional array of pocketed springs to thereby reduce the overall cost of the spring assembly. In particular, it would be desirable to provide a way to join strings of pocketed assemblies while the strings are being formed. In this way, a two-dimensional array of pocketed springs may be formed in a single, continuous process.

SUMMARY OF THE INVENTION

The invention provides exemplary fabric quilts, pocket spring assemblies, and apparatus and methods for producing such fabric quilts and pocket spring assemblies. The invention also provides exemplary mattresses incorporating such pocket spring assemblies. In one exemplary embodiment, a pocket spring assembly comprises a plurality of elongate fabric tubes disposed adjacent to each other. Each of the fabric tubes has a plurality of pockets into which a spring is disposed. Further, at least some of the pockets of adjacent fabric tubes are welded together at midpoints on the adjacent pockets, i.e. at locations where adjacent springs in adjacent tubes are closest to each other. Such a construction is preferably accomplished by welding together adjacent pockets utilizing welders which are disposed within the pockets. By utilizing a heat fusible material to construct the fabric tubes, the welder heat fuses the material together to produce an internal weld. In this manner, adjacent fabric tubes may be joined together just prior to depositing springs within each of the tubes so that the resulting pocket spring assembly is produced in a single, continuous process.

Each fabric tube preferably has a longitudinal axis, and each spring has a central axis about which the spring is coiled. The central axis of each spring is preferably oriented so that it is generally perpendicular to the longitudinal axis of the fabric tube. In one aspect, each fabric tube includes a plurality of closed segments which are spaced apart from each other to form the pockets. The closed segments preferably comprise welds that are generally perpendicular to the longitudinal axis of the fabric tubes.

The invention further provides an exemplary mattress which includes a pocket spring assembly having a plurality of elongate fabric tubes which each include a plurality of pockets into which springs are disposed. At least some of the pockets of adjacent tubes are welded together at midpoints on the adjacent pockets as described above. The mattress further includes at least one layer of padding material that is disposed on a top side of the spring assembly. A fabric cover is positioned over the spring assembly and the layer of padding material.

The invention also provides an exemplary method for producing a fabric quilt assembly. According to the method, a plurality of separate fabric tubes which are disposed laterally adjacent each other are simultaneously formed. A closed segment is simultaneously formed in each of the fabric tubes, and adjacent tubes are simultaneously joined together proximate the first closed segment.

In one aspect, the adjacent tubes are joined by welding the adjacent fabric tubes from within the fabric tubes. In another aspect, the closed segments are formed and the adjacent tubes are joined at substantially the same time.

The invention still further provides an exemplary method for producing a pocket spring assembly. According to the method, a plurality of fabric tubes are formed. A first closed segment is formed in each of the fabric tubes, and adjacent tubes are joined proximate to the first closed segment. A spring is placed adjacent to the first closed segment of each fabric tube. Preferably, the adjacent tubes are joined together before placement of the springs adjacent to the first closed segment. A second closed segment is then formed in each of the fabric tubes in a manner such that the springs are disposed between the first and the second closed segments in a fabric pocket. Once each fabric has received a first spring, a second spring is placed behind the second closed segment after first joining adjacent tubes proximate to the second closed segment. A third closed segment is then formed in each of the fabric tubes behind the second springs. This process is then repeated as many times as needed to produce the desired size of the pocket spring assembly. In this manner, a way is provided to produce a two-dimensional array of pocketed springs in a continuous process.

In one particularly preferable aspect, adjacent tubes are joined together by welding the adjacent fabric tubes from within the fabric tubes. In this way, the two-dimensional array of pocketed springs may be formed in a continuous process, without the need to separately join strings of pocketed springs as with conventional prior art techniques.

In another particular aspect, the method utilizes a plurality of parallel guide members which each has a longitudinal axis and a longitudinally oriented channel. In this way, at least a section of each of the fabric tubes is placed over the guide members, and the springs are introduced through the channels until they exit the guide members and expand within the fabric tubes. Preferably, the adjacent tubes are joined together while the fabric tubes remain over the guide members to allow the pocket spring assembly to be formed in situ. For example, the fabric tubes are preferably advanced over guide members after a spring has been inserted and the second closed segment has been formed so that an additional row of springs may be introduced through the guide members and a closed segment formed behind each of the springs in the row.

Each of the springs has a central axis about which the springs are coiled, and the central axis of each spring is preferably perpendicular to the longitudinal axis of the guide members when introduced through the channels. Further, the first and the second closed segments are preferably produced by welds that are generally perpendicular to the longitudinal axis. In another aspect, each fabric tube is formed from a single piece of fabric. Preferably, two side edges of each piece of fabric are welded together along a longitudinal line to form the fabric tubes.

The invention also provides an exemplary apparatus for producing a pocket spring assembly. The apparatus comprises a plurality of parallel guide members which each have a longitudinal axis and a longitudinally oriented channel. The guide members are each configured to be received into at least a section of a fabric tube. An advancement mechanism is provided to selectively advance the fabric tubes over the guide members. The apparatus also includes a dispensing mechanism to dispense compressed springs through the channels and into the fabric tubes. When dispensed, a central axis of the springs is perpendicular to the longitudinal axis. A connection mechanism is provided to produce closed segments in the fabric tubes to form a fabric pocket around each spring. Further, a joining mechanism is provided to join adjacent fabric tubes before dispensing of the springs. In this way, an apparatus is provided for producing a two-dimensional array of pocketed springs in situ, i.e., while at least a portion of the fabric tubes remain over the guide members.

In one particular aspect, a compression mechanism is provided to compress the springs so that they may be inserted through the channels. The apparatus preferably also includes at least one folding element that is associated with each guide member. The folding element is configured to form a piece of fabric into one of the fabric tubes. Fabric welding mechanisms are preferably also provided to weld two ends of the pieces of fabric together to form the fabric tubes.

In one particularly preferable aspect, the connection mechanisms each comprise a pair of jaws to produce a weld in the tubular fabric sections generally perpendicular to the longitudinal axis. The joining mechanisms preferably each comprise welders to produce welds between the adjacent tubular fabric sections, with the welds being made from within the tubular fabric sections.

DETAILED DESCRIPTION OF THE SPECIFIC EMBODIMENTS

The invention provides exemplary apparatus and methods for producing fabric quilts and pocket spring assemblies. The pocket spring assemblies of the invention are preferably constructed so that they include a two-dimensional array of springs which are disposed within fabric pockets. Preferably, each of the fabric pockets is formed within an associated fabric tube. Further, each of the fabric tubes are joined together at spaced apart locations to form the two-dimensional array of pockets. One particularly important feature of the invention is that the pockets are created, the springs are inserted, and adjacent pockets of adjacent tubes are joined together in one continuous process. In this way, a two-dimensional spring assembly may be formed without the need for separately joining individual strings of pocketed springs as with previously proposed techniques. In this way, an extremely efficient method is provided for producing two-dimensional arrays of pocketed spring assemblies, thereby significantly reducing the cost to produce such spring assemblies.

The pockets of the invention are preferably formed using a welding process where a heating element is forced against an anvil. Adjacent pockets in adjacent fabric tubes are preferably joined together in a similar manner. However, it will be appreciated that various other joining or connection techniques may be employed, including gluing, stapling, application of one or two part fasteners, ultrasonic welding, and the like.

Figures 1A, 1B, 1C:
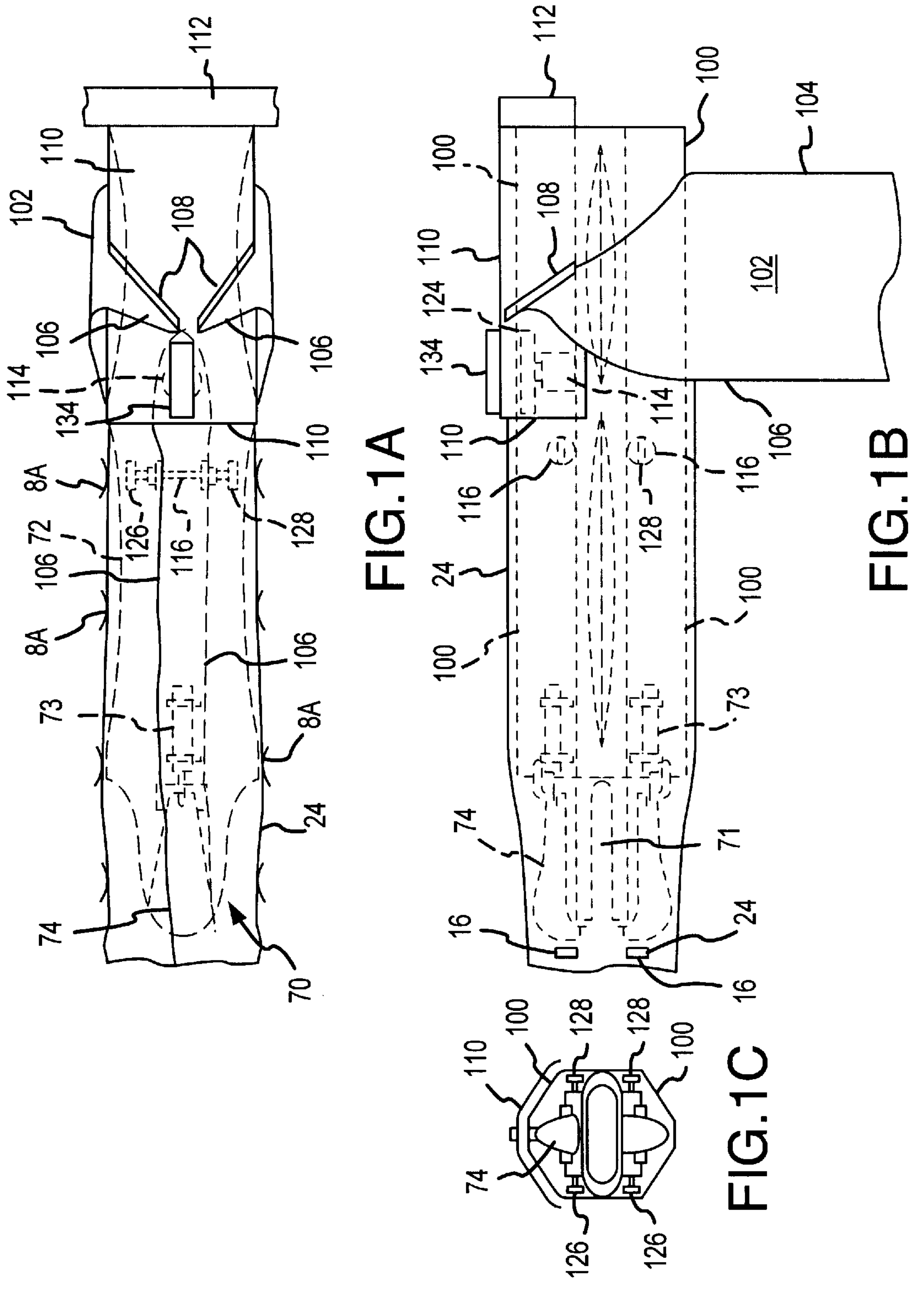
FIG. 1A is a top view of a guide member and associated components employed to produce a two-dimensional array of pocket spring assemblies when used in combination with multiple similar guide members according to the invention.
FIG. 1B is a side view of the guide member and associated components of FIG. 1A.
FIG. 1C is an end view of the guide member and associated components with FIG. 1B.

Referring now to FIGS. 1A–1C, modifications to the apparatus described in WO 94/18116 and U.S. Pat. No. 5,699,998 to integrate the production of joined adjacent fabric tubes with the formation of a two-dimensional pocket spring assembly will be described. The equipment shown in FIGS. 1A–1C is also described in PCT Application No. PCT/CA98/01188, filed Dec. 22, 1998, and co-pending U.S. application Ser. No. 08/995,857, filed Dec. 22, 1997 now U.S. Pat. No. 6,029,957. The complete disclosures of all the references in this paragraph are herein incorporated by reference.

The equipment shown in FIGS. 1A–1C comprises an assembly 70 having a guide member 72 through which compressed springs are advanced by one spring diameter each time a new spring is inserted. For convenience of illustration, only one assembly 70 is shown. However, it will be appreciated that the spring assembly apparatus will include a row of substantially identical assemblies 70 which are placed adjacent to each other. Guide member 72 includes a pair of openings 71 to in part reduce the frictional engagement between guide member 72 and the springs which are inserted through guide member 72. At a forward end of each guide member 72 is pivoted upper and lower arms 74, each actuated by a small air cylinder 73 between extended and retracted positions. Arms 74 are opened to form upper and lower folds in the fabric tube to allow a fastening mechanism to apply fasteners as described in U.S. Pat. No. 5,699,998, previously incorporated by reference. Alternatively, as described below, arm 74 and air cylinder 73 may be eliminated and a vertical welding mechanism employed to produce vertical welds in the tubes which form the pockets around the springs.

Assembly 70 further includes a tubular sleeve 100 which terminates just proximal to openings 71 and provides a surface for supporting a quilt 24 which is formed in situ, i.e., on multiple assemblies 70, from a plurality of webs of material 102 drawn from spools (not shown). Each web of material 102 is associated with one assembly 70 so that a fabric tube may be formed around each assembly 70 using a single web of material. Each web 102 is conveniently folded to double on its associated spool, and the spool is oriented with its axis parallel to each assembly 70 so that each web 102 moves upwardly towards sleeve 100 and presents a fold 104 towards the rear of the machine. Forward edges 106 of web 102 pass into diagonal slots 108 in a folding guide 110, which like tubular member 100 is supported from a fixed member 112. Pulling of quilt 24 forwardly over tubular member 100 results in slots 108 and folding guide 110 folding web 102 around tubular member 100 so that edges 106 overlap to form a fabric tube.

Within tubular member 100, actuators 114 and 116, typically pneumatically operated, are provided carrying movable jaws 124, 126 and 128. Jaw 124 cooperates with a fixed jaw formed by an anvil 134 on folding guide 110 to form longitudinal welds on the lapped edges 106 of web 102 and thus seam it into a fabric tube. Jaws 126 and 128 cooperate with corresponding jaws in an adjacent assembly (not shown) so as to weld the fabric of adjacent fabric tubes together at vertically spaced connections. The spacing of the vertically spaced connections is preferably similar to the connections formed in the folds of the upper and lower layers of fabric of each fabric tube to separate rows of springs in the tubes. Preferably, the welds placed between the springs in each fabric tube is accomplished by utilizing pairs of welding jaws and anvils that are associated with each assembly 70. These welding jaws are preferably mounted above and below the outer ends of guide members 72. Such an arrangement enables a long welding cycle to be provided between each draw of quilt 24 for all of the welding mechanisms used, in each of which the jaws may be closed against each other through the two layers of fabric to be welded. Conveniently, a heating element associated with at least one of the jaws is activated to fuse the fabric material. The jaws may then remain closed with the heating element deactivated while the weld sets. The time available for such a cycle is that required to insert a complete row of springs so that there is ample time to set the welds before they are subjected to stress. Optionally, arms 74 and cylinder 73 may be eliminated, with the vertically oriented welds between the springs being created by the jaws which pinch the fabric together.

Figure 2:
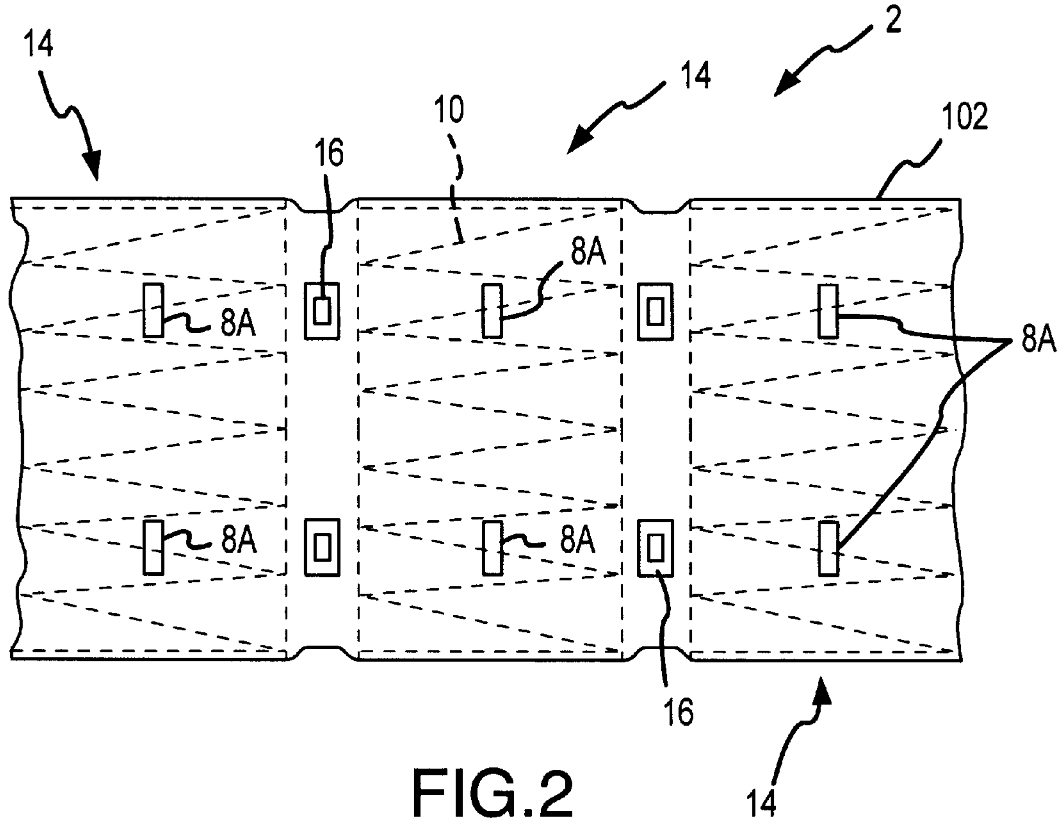
FIG. 2 is a vertical section through a spring assembly produced by the apparatus of Figs. 1A–1C, on a line extending parallel to and between adjacent fabric tubes.

Referring now to FIG. 2, an exemplary spring assembly 2 which is formed utilizing a plurality of assemblies 70 of FIGS. 1A–1C will be described. Spring assembly 2 of FIG. 2 is shown in cross-section such that only one column or string of springs 10 is shown. For example, the string of springs shown in FIG. 2 would be produced by one assembly 70 as shown in FIG. 1A. As such, spring assembly 2 is formed from a single web of fabric 102 as previously described in connection with FIGS. 1A–1C. Each web 102 that is formed into a tube is connected with an adjacent fabric tube by spaced connections 8A. These connections are formed by jaws 126 and 128 as previously described. The vertical welds between each spring 10 are referenced by reference numeral 16 and are formed by the vertically oriented welding jaws as previously described. After two pairs of welds 16 are formed, they define a pocket 14 into which spring 10 is disposed.

Hence, with the modification of FIGS. 1A–1C, spring assembly 2 includes welds 8A which provide connections between each pocket 14 and an adjacent pocket in an adjacent fabric tube, with each connection having an approximately equal span. Along each individual fabric tube, welds 16 secure the fabric tube to itself to form the pockets 14. As shown in FIG. 2, both welds 8A and 16 are spaced apart from a center plane of a spring assembly. Welds 8A and 16 are formed such that they are less than the height of spring 10 when expanded within pocket 14. This configuration is sufficient to provide an adequate connection between adjacent pockets to maintain the spring orientation in the pockets sufficiently to prevent innerspring interference, without prejudicing the independent compressibility of the springs which is a feature of pocket spring mattresses.

Another important feature of spring assembly 2 is that each fabric tube is formed from a separate web of material. In this way, mechanisms for securing adjacent tubes together may be disposed within each assembly 70 to allow quilt 24 to be formed in situ, i.e., directly on assembly 70. Another advantage of spring assembly 2 is that it is configured so that there is little independent motion of the vertical axis of pockets in adjacent rows. In this way, the springs are supported so that essentially no interference exists between coils of adjacent springs, which may cause undesirable noise as a user moves on a mattress or cushion incorporating the spring assembly. This advantage is obtained by providing fasteners 8A and 16 which are spaced apart from the central horizontal plane of the spring assembly, at approximately the same relative location. Although shown with spaced apart welds, it will be appreciated that welds 8A and 16 may be formed at different locations and have different lengths. For example, weld 16 may be formed the entire height of the fabric tube. It is, however, preferred that the vertical spans of the welds 8A and 16 are similar so as to provide substantially symmetrical connections between the pockets in both the longitudinal and lateral directions. Moreover, it will be appreciated that connections 8A and 16 may be formed using other connection schemes for which the apparatus can be accommodated within assemblies 70, such as clips, glue, staples, one or two part fasteners, and the like.

Since the length of the spring assembly that is produced when the quilt is formed in situ is limited only by the length of fabric on the rolls from which webs 102 are fed, a mechanism is preferably provided to cut the quilt once an assembly of sufficient length has been formed. This may be accomplished, for example, by running a pass of the apparatus with the spring feed disabled to produce a row of empty pockets through which the cut may be made.

Once the spring assembly has been formed, it may be incorporated into a mattress, cushion, or other type of furniture. To construct a mattress, one or more layers of padding are placed adjacent to one or both sides of the spring assembly. A fabric cover is then secured about the assembly.

FIGS. 3–15 illustrate a particularly preferable embodiment of the invention, incorporating many of the same principles as described with reference to FIGS. 1A, 1B, 1C and 2. One particularly advantageous feature of the embodiment of FIGS. 3–15 is that it provides the ability to form the quilt in situ as previously described.

Figure 3:
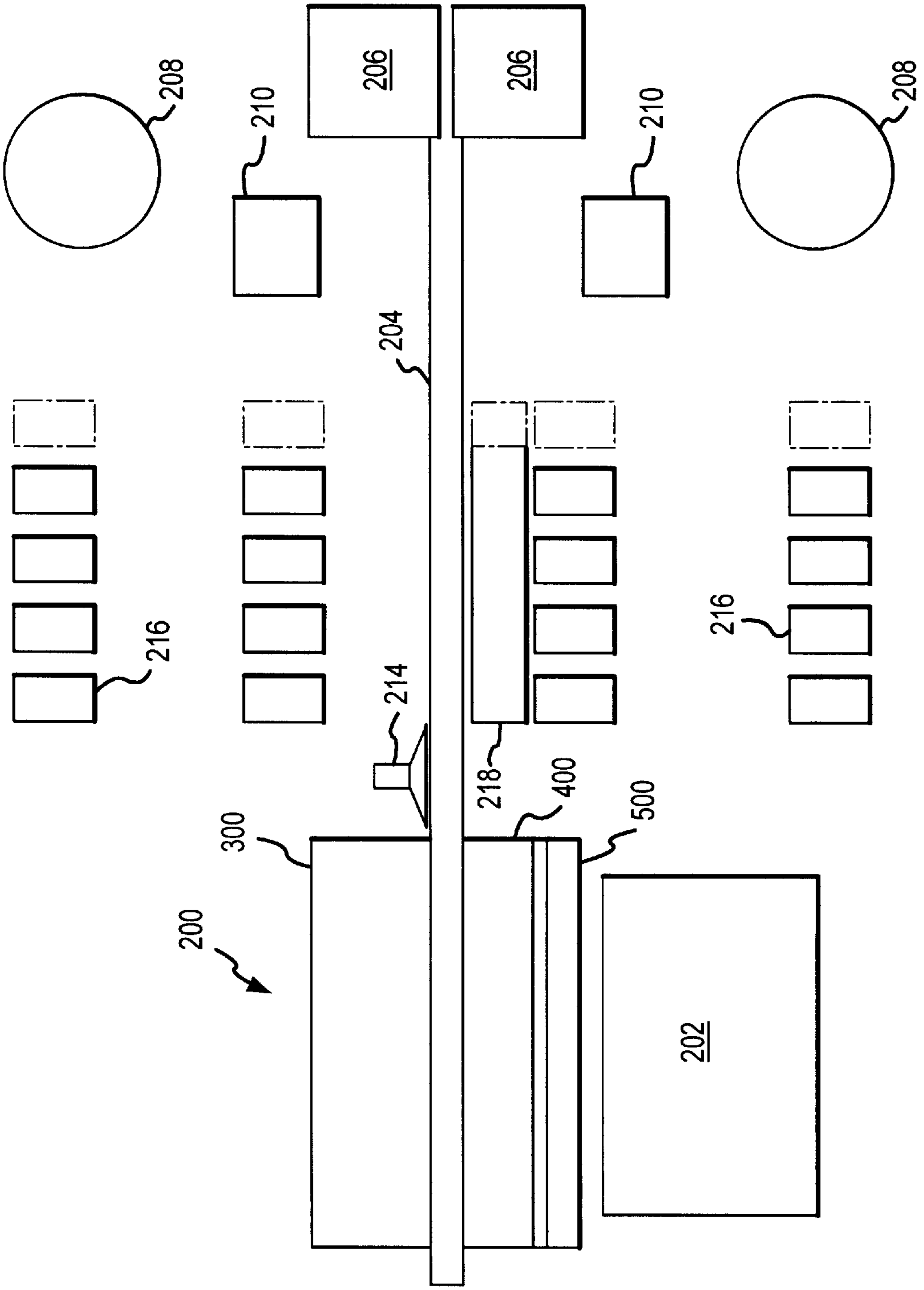
FIG. 3 is a general arrangement plan of a particularly preferably embodiment of a pocket spring forming apparatus according to the invention.
Figure 5:
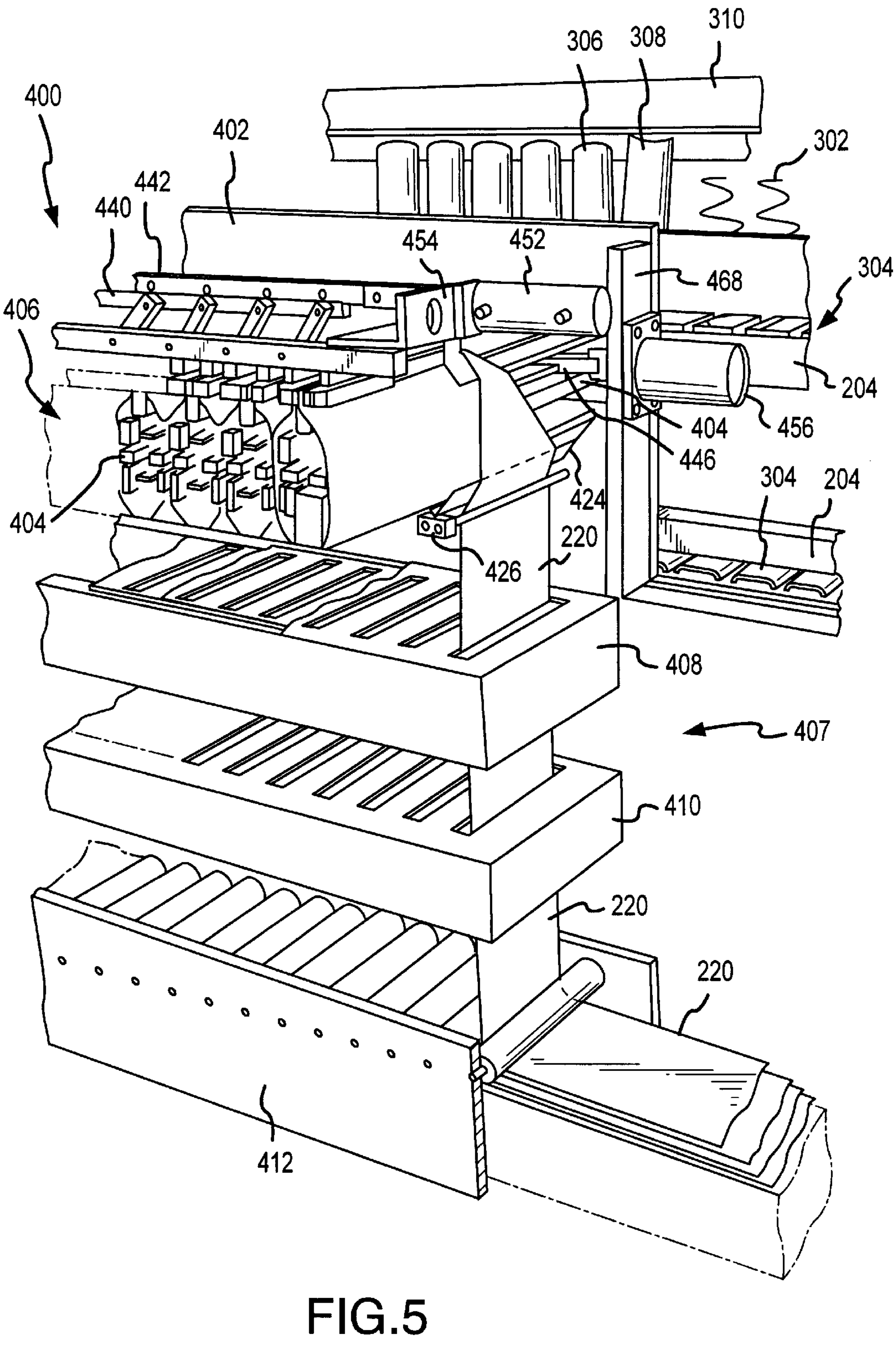
FIG. 5 is a perspective view of part of a tube forming and cross-welding zone of the apparatus of FIG. 3.

A general layout of an apparatus 200 for forming spring assemblies is shown in FIG. 3. Apparatus 200 is associated with a table 202 for receiving each assembly as it is formed. Springs are fed to apparatus 200 by a conveyor 204 which receives them from spring making and tempering machines 206. Associated with machines 206 are wire feeds 208 and control units 210 as is known in the art. Springs on conveyor 204 which were heat treated in spring making machine 206 pass an optional cooling fan 214 before reaching apparatus 200. Webs of material for forming fabric tubes of a quilt in apparatus 200 are drawn from rolls 216. Each web of material is folded in half and turned 90 degrees by a folding assembly 218 before being passed as multiple folded superposed webs 220 (see FIG. 5) to apparatus 200, in a direction parallel to that of conveyor 204, as best shown in FIG. 5. Apparatus 200 is shown divided generally into functional zones; namely a spring feed zone 300, a tube forming and cross-welding zone 400, and a pulling and spring pocketing zone 500.

Figure 4:
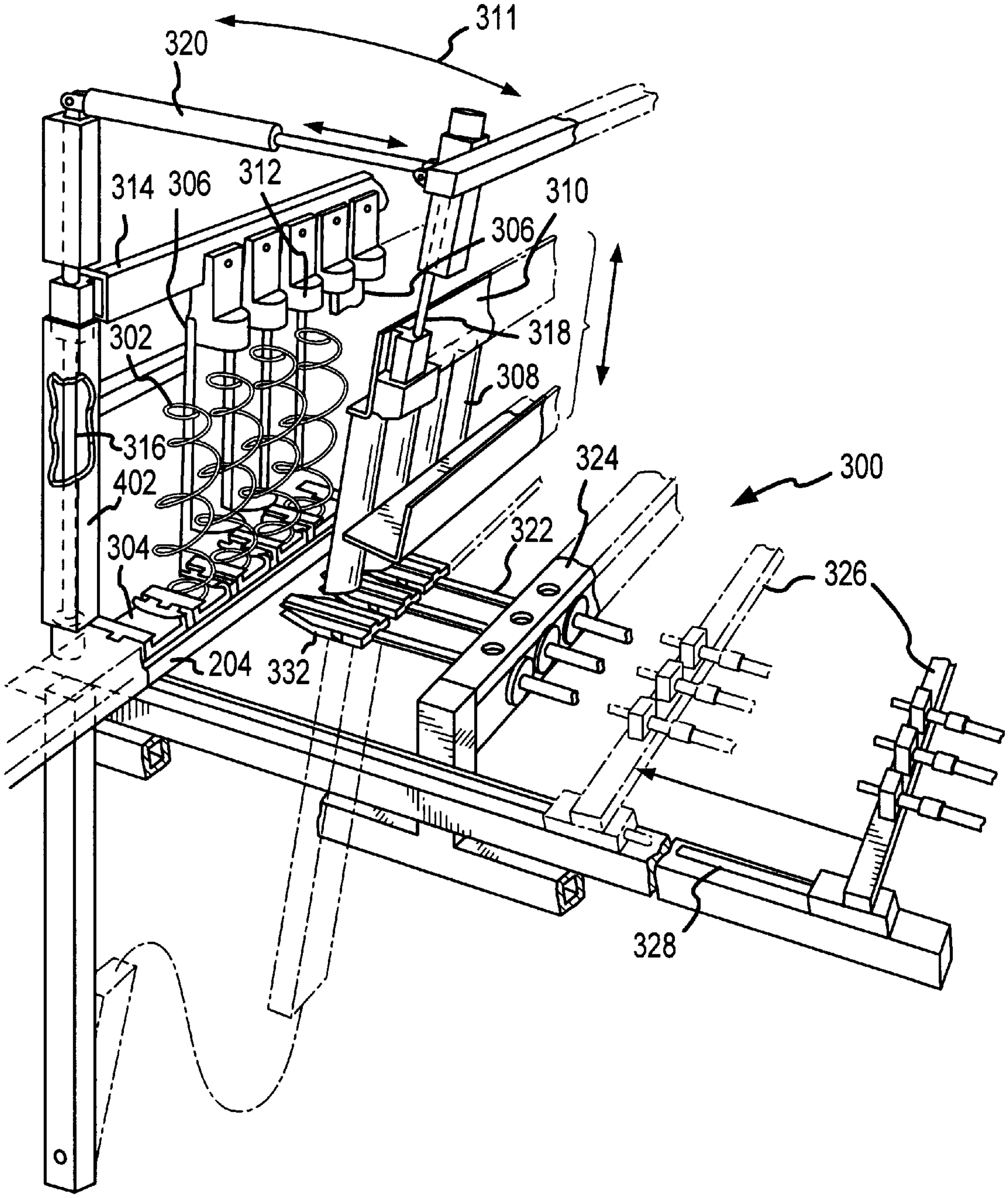
FIG. 4 is a perspective view of part of a spring feed zone of the apparatus of FIG. 3.

Referring now to FIG. 4, an upper run of spring conveyor 204 is shown. Conveyor 204 is disposed below spring feed zone 300. A transverse cross member 402 is employed to support other elements (which are shown in FIG. 5) of tube-forming and cross welding zone 400. Individual coil springs 302 have bottom turns received in shoes 304 attached to conveyor 204. Springs 302 are loaded and removed from conveyor 204 by moving their bottom turns perpendicular to the direction of movement of conveyor 204. Conveyor 204 moves a row of springs into spring feed zone 300, alongside a row of vertical semi-cylindrical spring receivers 306. For convenience of illustration, only one end of this row is shown in FIG. 3. In practice, the number of receivers will be equal to the maximum number of columns of springs required in a spring assembly. For mattress spring assemblies, this number is typically at least 32 and preferably 40, depending on the spring size to be used, and assuming that the columns run transversely of the length of the mattress. It should be appreciated that many elements of the apparatus to be described will be duplicated identically for each column of springs in the assembly, and in all such cases only a single element or a few elements will be illustrated.

Figure 4A:
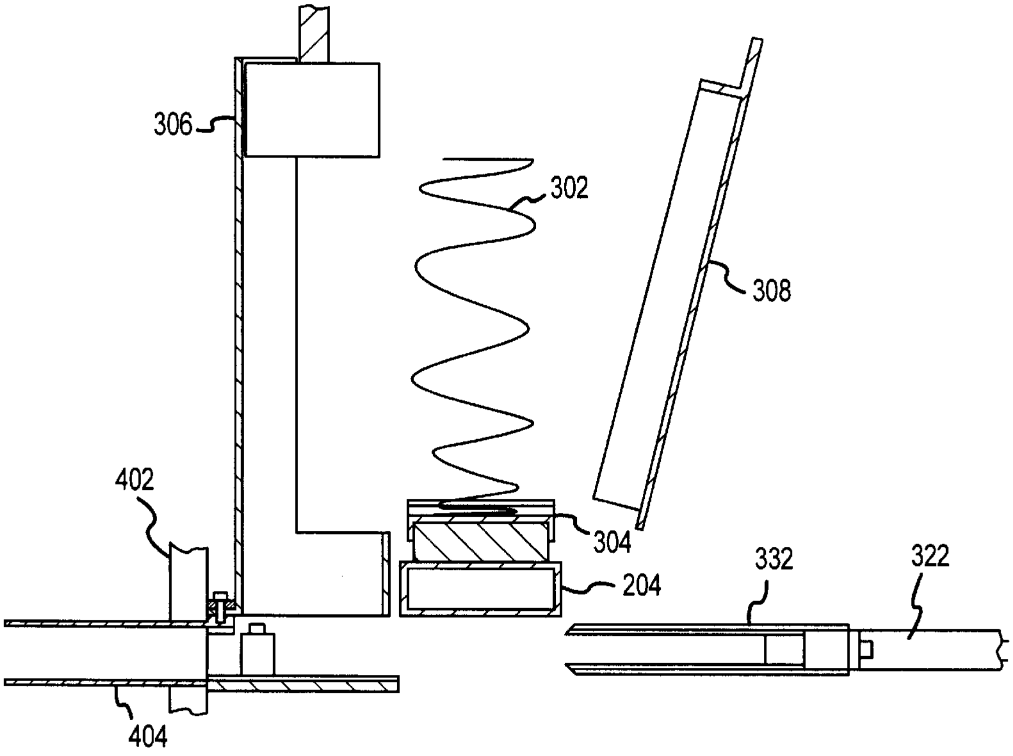
FIGS. 4A, 4C, 4D, 4F and 4H are fragmentary vertical sectional views.
Figure 4B:
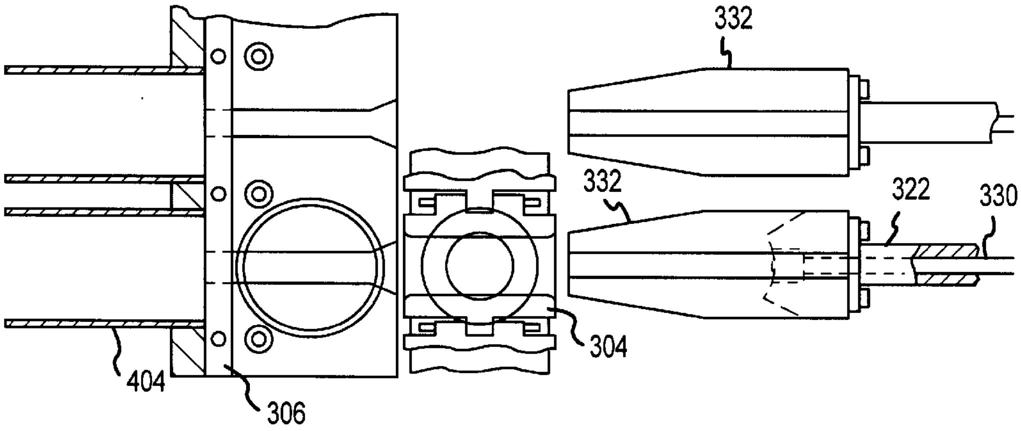
FIGS. 4B, 4E, 4G and 4I are fragmentary broken away plan views illustrating the transfer of a spring from a conveyor and into a spring assembly according to the invention.
Figure 4C:
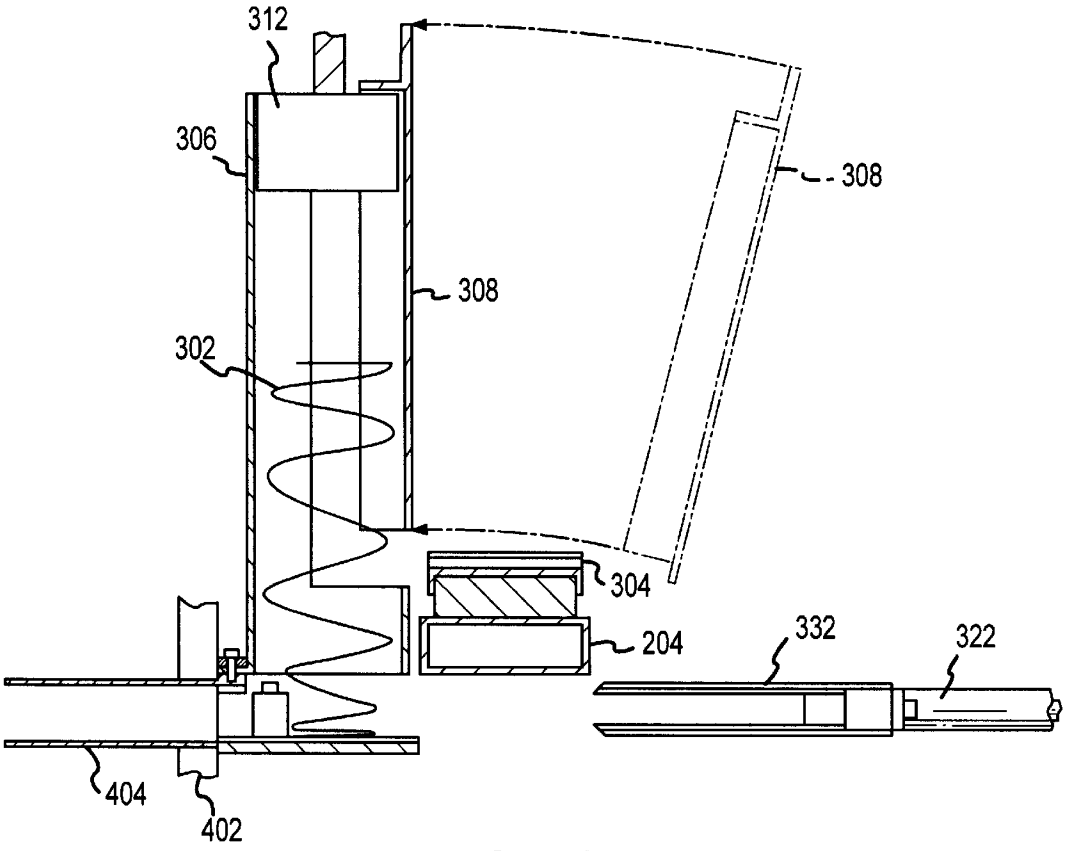
Figure 4D:
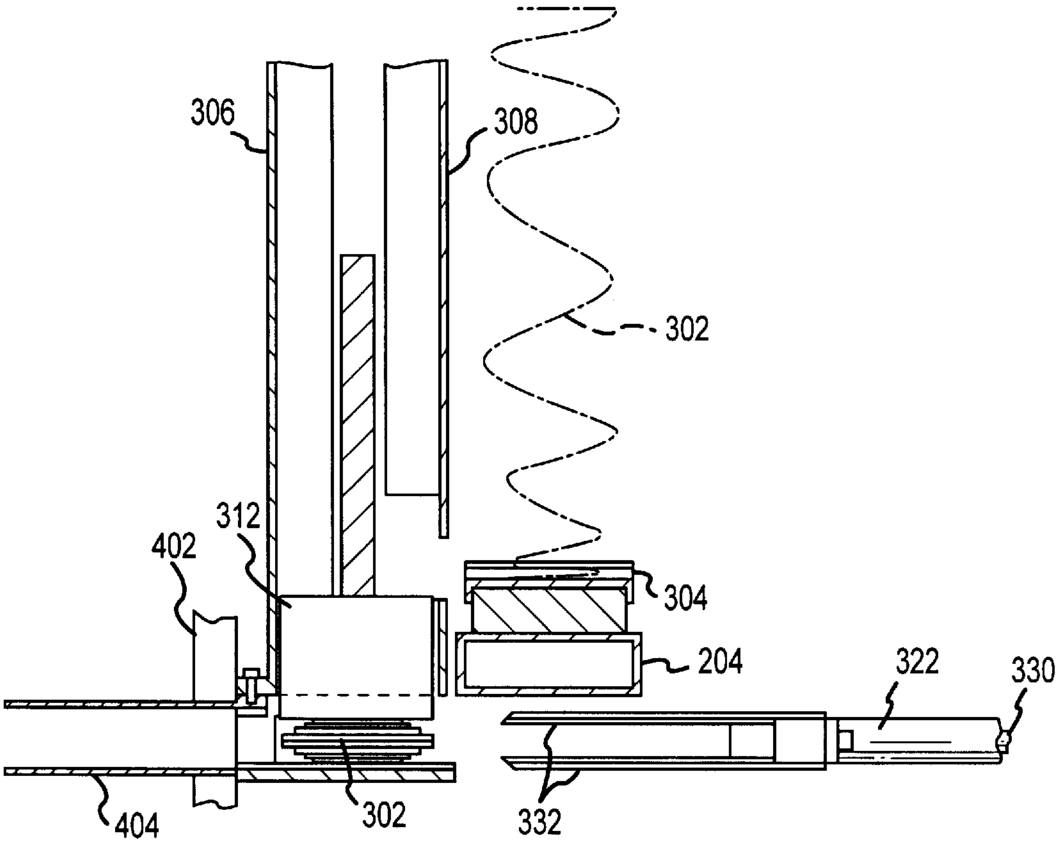

Opposite receivers 306 is a transverse member 310 supporting a corresponding row of semi-cylindrical spring pushers 308 (see also FIGS. 4A and 4B), which move with member 310 during a row cycle in a path illustrated by an arrow 311. By "row cycle" is meant a cycle of operations of apparatus 200 to produce a row of springs in the spring assembly, i.e. one spring in each column. An initial arcuate forward movement of the pushers 308 by an actuator 320 moves a row of springs 302 out of shoes 304 and into receivers 306 as shown in FIG. 4C. Pushers 308 cooperate with receivers 306 to form vertical tubes as shown in FIG. 4D. Springs 302 in the tubes are then compressed by plungers 312 to the condition shown in FIG. 4D. Plungers 312 are moved downward by an actuating bar 314 driven by a actuator 316. Subsequently, member 310 and pushers 308 are lifted by actuator 318. Member 310 and pushers 308 are then moved rearwardly and downwardly to their original position by actuator 320 and actuator 318. In this manner, pushers 308 are clear from another set of springs advanced by conveyor 204.

Figure 4E:
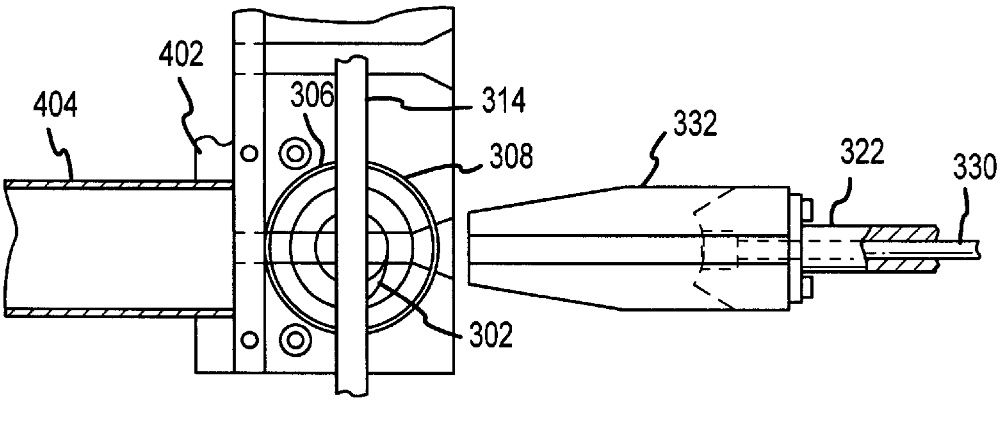
Figure 4F:
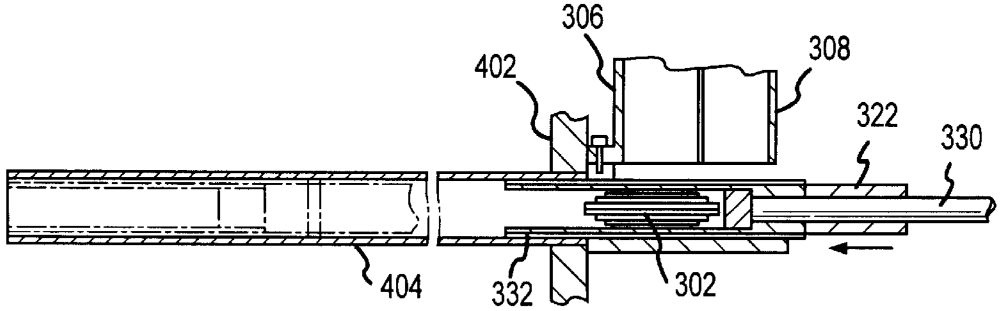
Figure 4G:
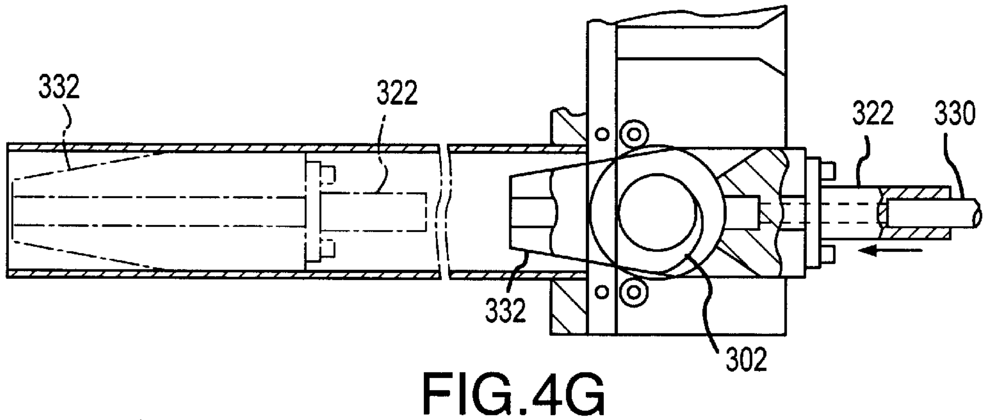
Figure 4H:
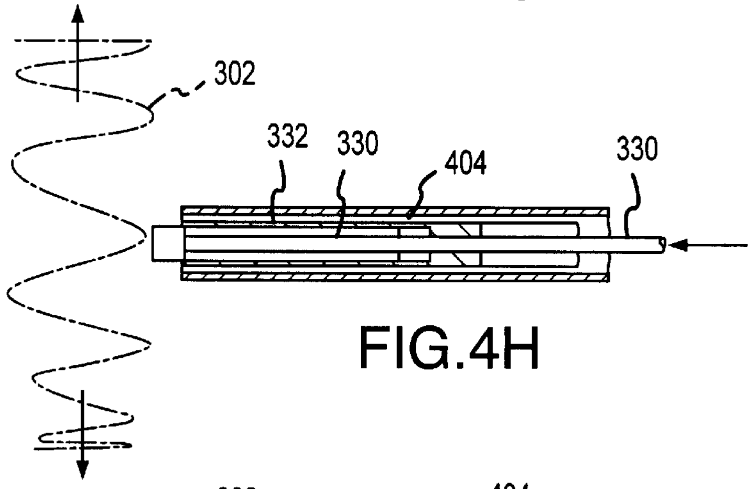
Figure 4I:
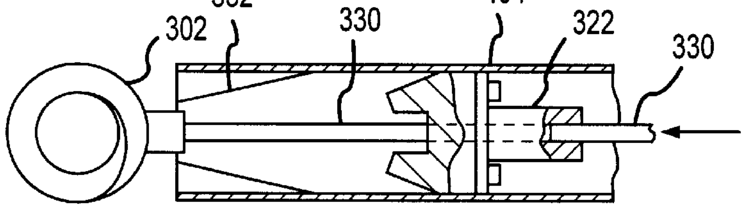

Referring also now to FIGS. 4D–4I, springs 302 compressed by the plungers 312 are in line with open ends of horizontal forward extending transfer tubes 404, the rear ends of which pass through and are secured in cross member 402 (see FIGS. 4D and 4E). Also in line with tubes 404 are push rods 322 which pass through a transverse guide member 324 and are connected to a transverse push bar 326 driven by actuators 328 (see FIG. 4). Push rods 322 are tubular and contain secondary push rods 330 actuated by an actuator (not shown) operating between a secondary push bar (not shown) connected to rods 322 and push bar 326. At the forward ends of push rods 322 are upper and lower plates forming duckbills 332 which are adapted to receive springs 302 as push rods 322 are moved forward beneath plungers 312, as shown in FIGS. 4F and 4G. When duckbills 332 reach the limit of their travel at forward ends of tubes 404 as shown in FIGS. 4H and 4I, secondary push rods 330 are extended to eject springs 302 from duckbills 332, as discussed further below.

FIG. 5 is a fragmentary view of tube forming and cross-welding zone 400 of apparatus 200. In zone 400, a quilt is formed into which springs 302 are to be inserted. Tube forming assemblies 406, of which only a few are shown, are mounted on cross-member 402 concentric with spring transfer tubes 404. Assemblies 406 are arranged to receive folded webs 220 of fabric from a fabric puller assembly 407 which comprises brake mechanisms 408 and 410 disposed above a roller box 412. Roller box 412 is arranged to turn webs 220 so that one web 220 is provided to each assembly 406.

Figures 6A, 6B:
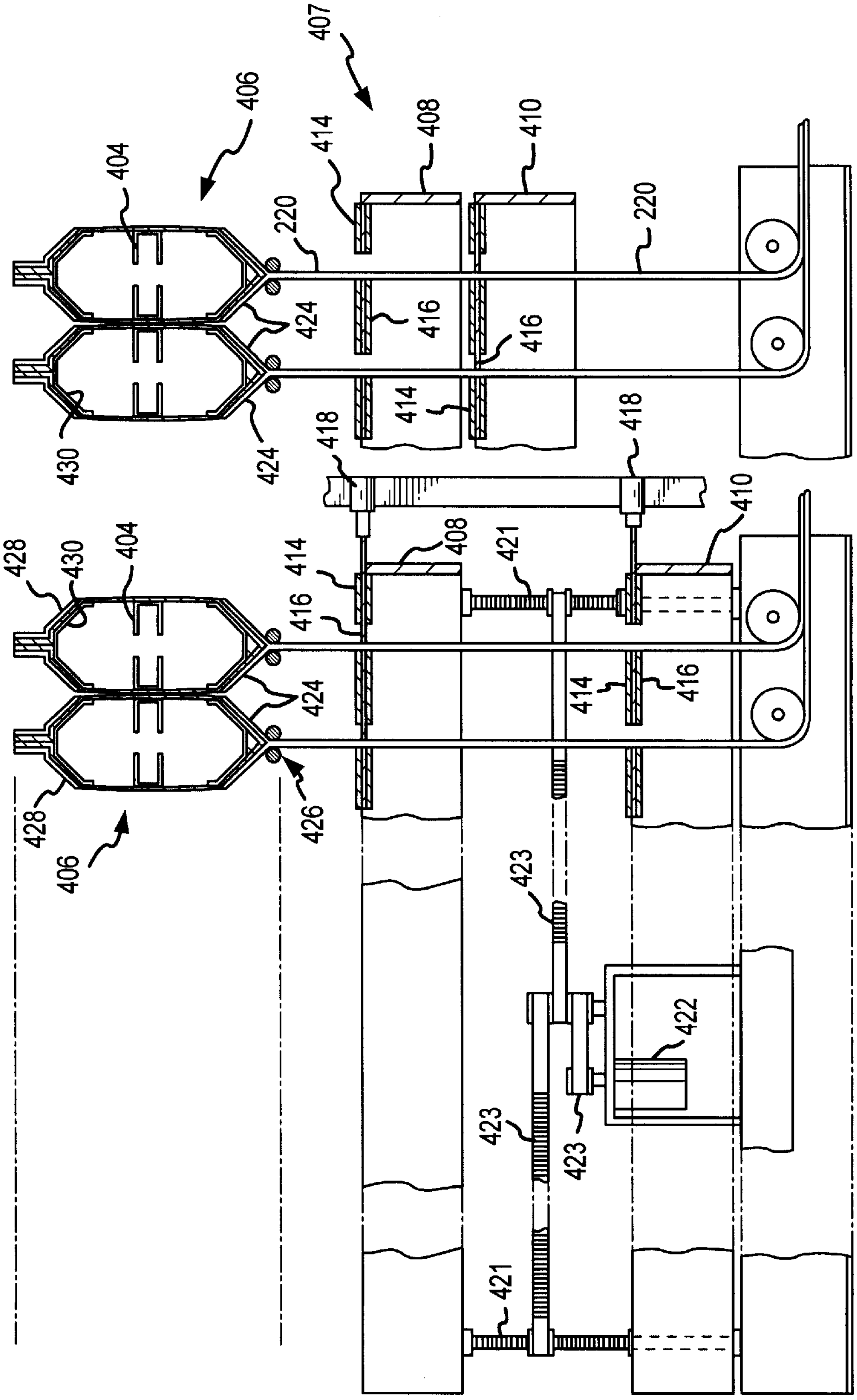
FIGS. 6A and 6B are simplified fragmentary lateral vertical sections illustrating operation of fabric feeding elements shown in FIG. 5.

The operation of brake mechanisms 408 and 410 of fabric puller assembly 407 is best shown in FIGS. 6A and 6B. The purpose of the assembly 407 is to draw measured lengths of fabric from rolls 216, equal to the lengths of fabric drawn forward over the forming assemblies 406 by a pulling assembly in zone 500, as described later. Each mechanism 408 and 410 is provided with a top plate 414 having slots to pass the folded fabric webs and a slotted brake plate 416, movable laterally to clamp the webs between the slots of the two plates by an actuator 418. The fabric is normally clamped by actuator 418 of top mechanism 408 as shown in FIG. 6A. However, during a pulling operation, actuator 418 of top mechanism 408 is released and that of mechanism 410 is engaged as shown in FIG. 6B. A motor 422 drives lead screws 421 through belts 423 so as to raise mechanism 410 and pull the fabric. An exemplary motor that may be used is a servomotor, commercially available from Omron. After completion of the pulling stroke, the brake of mechanism 410 is disengaged and that of mechanism 408 is engaged so that motor 422 may return mechanism 410 to its original position ready for another pulling operation.

Figure 9:
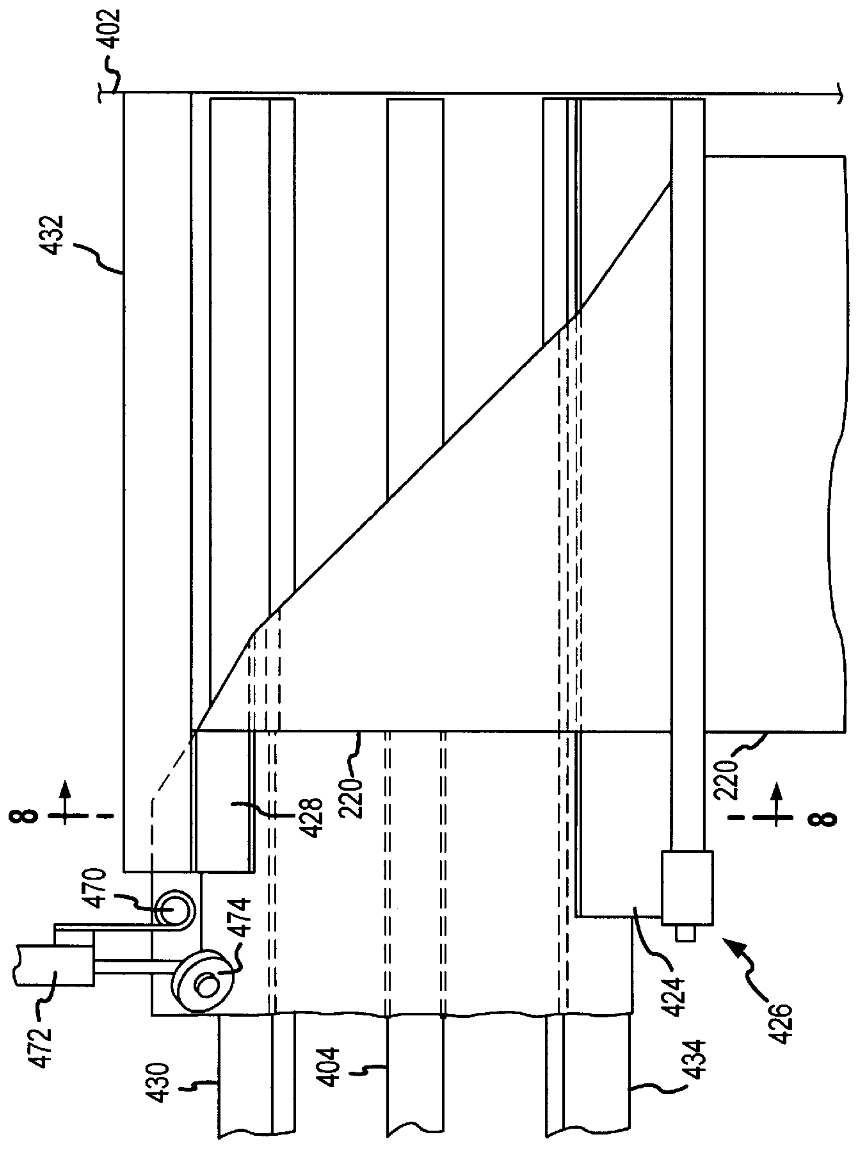
FIG. 9 is a section of the line 9—9 in FIG. 8.
Figure 8:
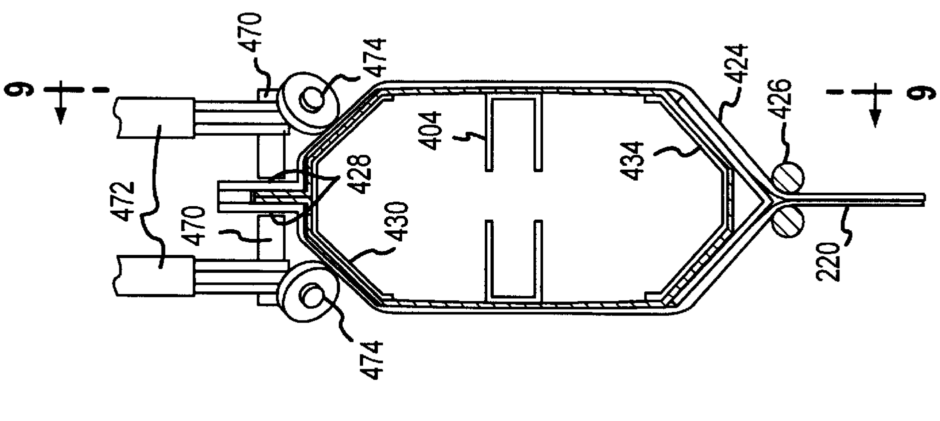
FIG. 8 is a section through a single tube forming assembly on the line 8—8 in FIG. 9.

Above mechanism 408, webs 220 (with the opening of their folds facing towards the front) pass upwardly around each assembly 406 and are tuck-folded through 90 degrees around each assembly 406 so as to be directed forwardly with the fold openings directed upwardly (see also FIGS. 8 and 9). Each assembly 406 comprises a lower guide plate 424, which splits the fold of the fabric, and beneath which is mounted a guide rod assembly 426 whose rods guide the fabric over the outer portions of plate 424. Folding guides 428 guide the free edges of the fabric onto an upper folding plate 430, with the free edges projecting upwardly, while the rear portion of the fabric is tuck folded forward over plate 434 and passes between plates 424 and 434. Guides 428 are supported from cross member 402, as are folding plates 430 and 434, guide plates 424 and tube 404.

Referring now to FIGS. 8 and 9, operation of a fabric alignment scheme will be described. In order to counter any tendency of the fabric to track incorrectly through the folding assemblies, an optical sensor 470 is located on each side of a fin projecting upwardly from folding guide 430 between the edges of the fabric just forward of guides 428. If the fabric moves out of alignment, one of its edges will move down and uncover the fin so that the misalignment will be detected by the sensor on that side. In response, the sensor will activate an actuator 472 on that side to press a skewed guide wheel 474 against the fabric. Guide wheel 474 is angled to pinch the fabric against guide 430 and steer it back on course until the fin is again covered, at which point the actuator is released.

Figure 7B:
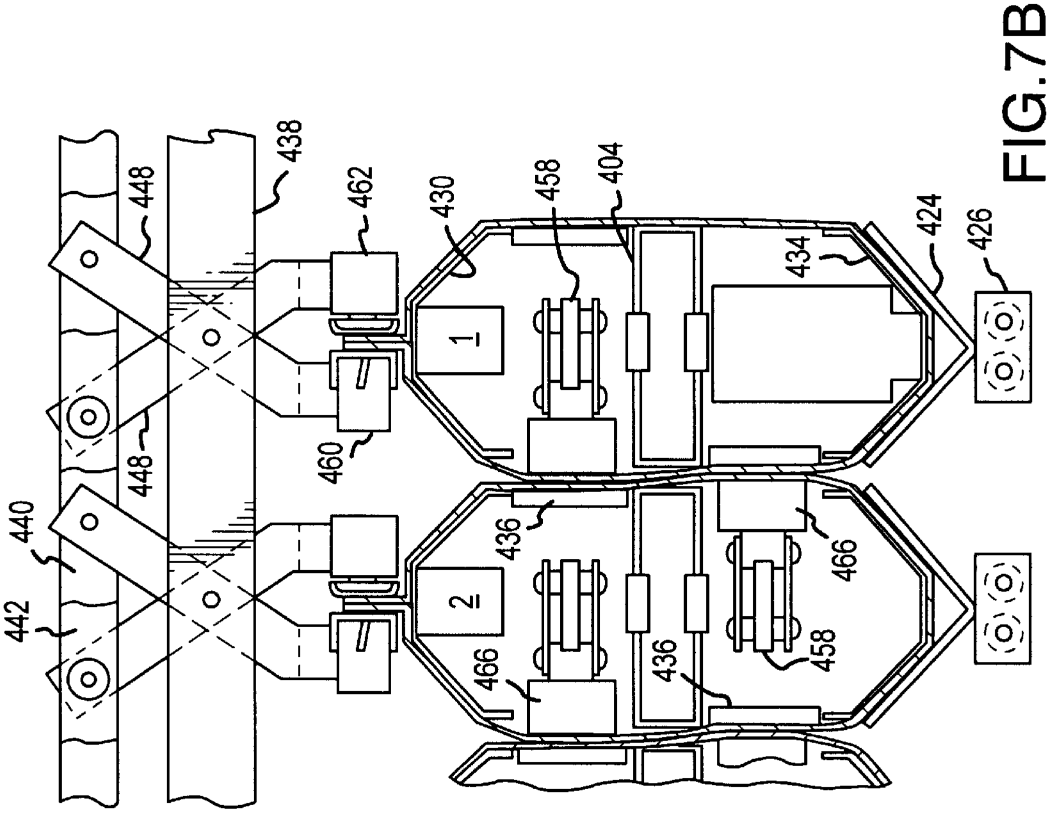
FIGS. 7A and 7B are lateral vertical sections through fabric tube forming assemblies shown in FIG. 5.
Figure 7A:
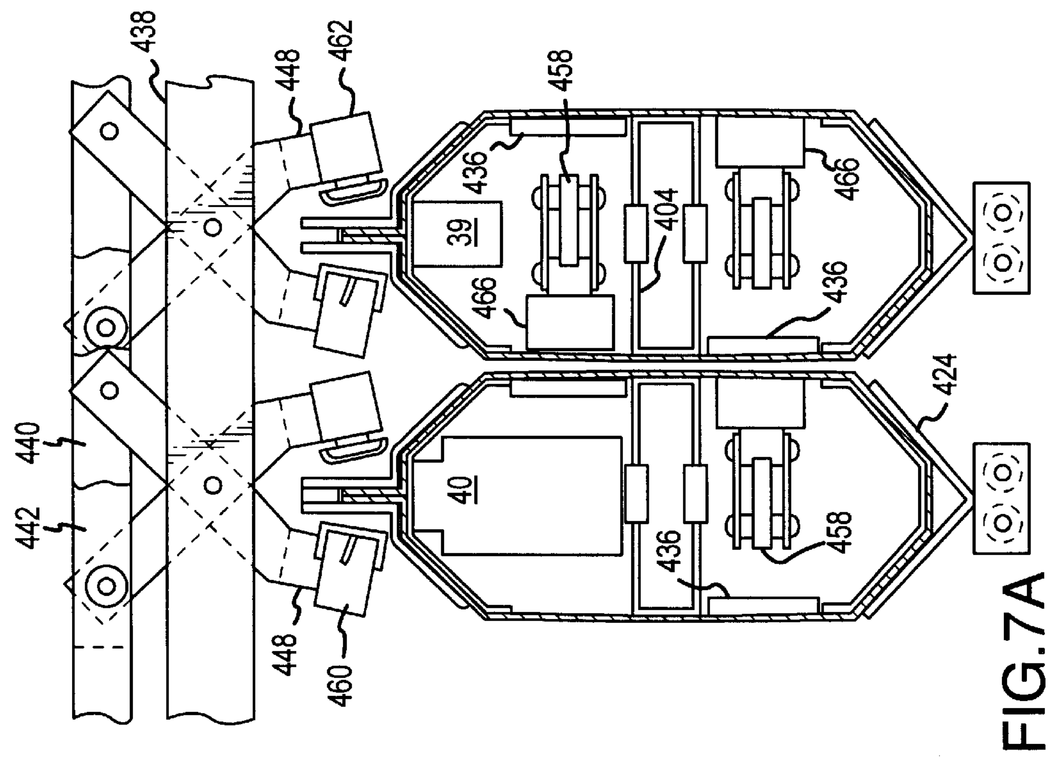
Figure 7C:
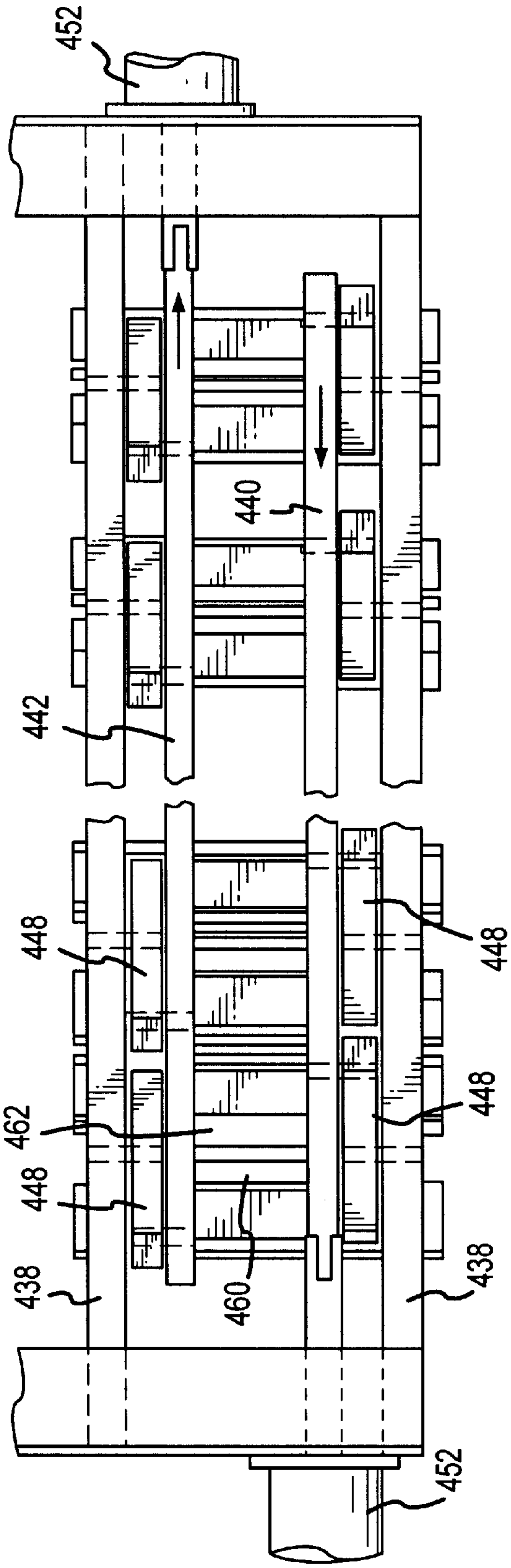
FIG. 7C is a top view of the fabric tube forming sections of FIG. 7B showing thermal welding elements in a sealing position.

Referring back to FIG. 5, four actuating bars 440, 442, 444 (see FIG. 10A) and 446, operated by actuators 452 and 456, extend laterally of the row of assemblies 406, each being movable by its actuator through a short lateral stroke. Structures 454 and/or 468 supporting the actuating bars and associated parts may be mounted for limited forward and rear movement together with the parts they support, as described further below. Bars 440 and 442, as best shown in FIGS. 7A–7C, actuate scissor arms 448 pivoted on fixed lateral bars 438 so as to clamp free edges of the fabric between thermal welding elements 460 and anvils 462. In this way, webs 220 are formed into fabric tubes into which springs 302 will be inserted as described hereinafter.

Figure 10:
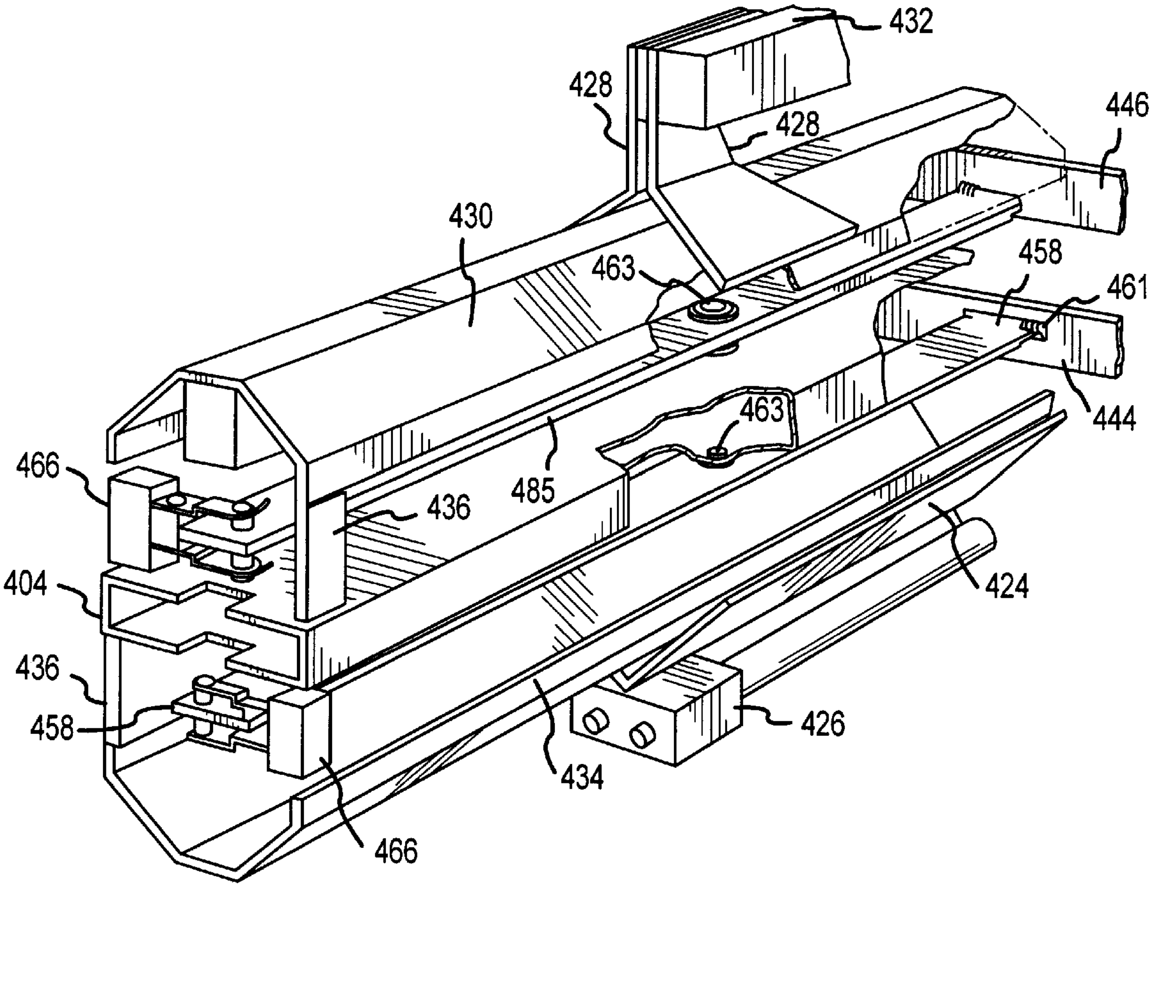
FIG. 10 is a front perspective view of a single fabric tube forming assembly.
Figure 10A:
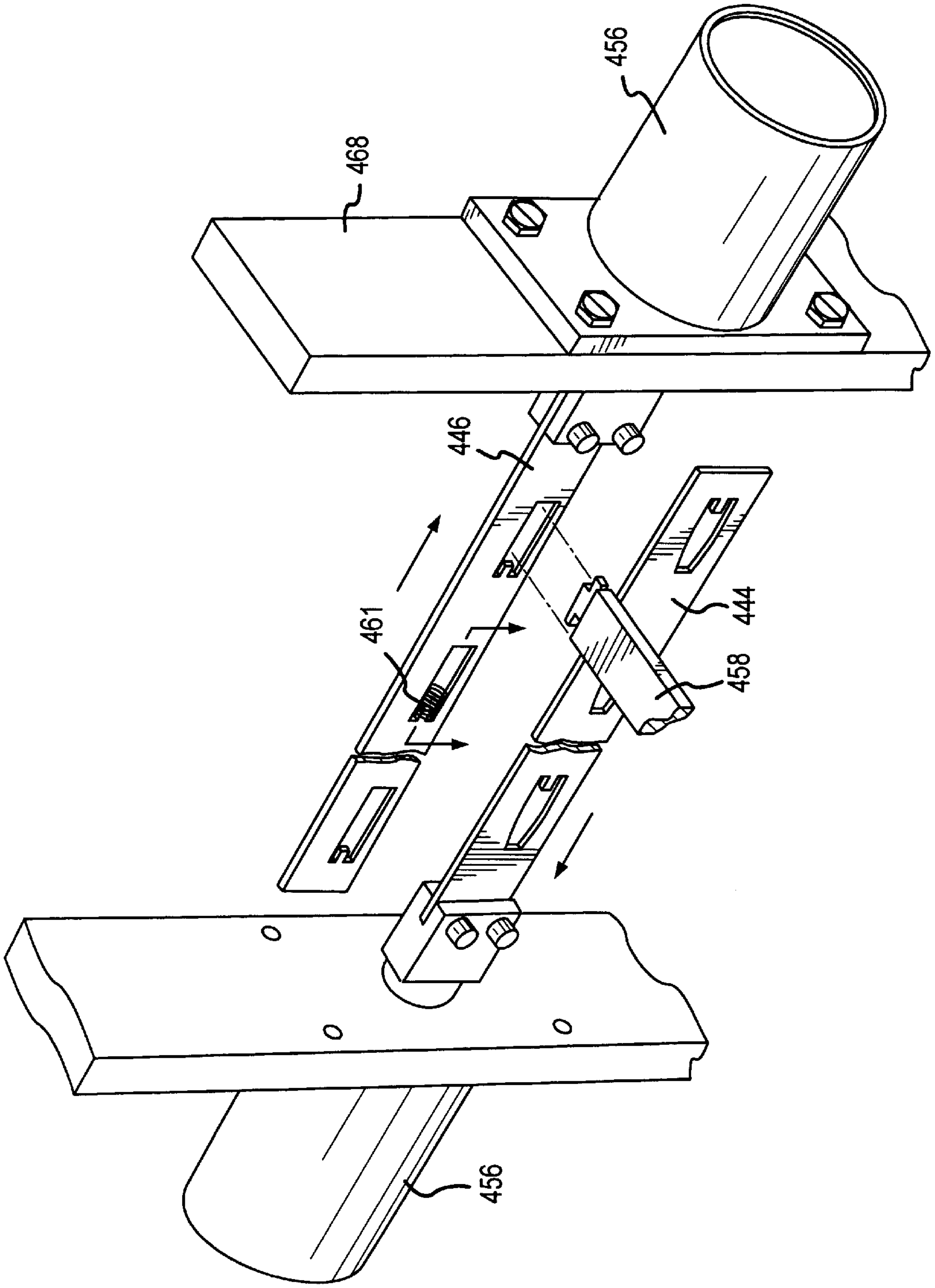
FIG. 10A is a perspective view of an operating lever of FIG. 10 for moving thermal welding elements of FIG. 10.
Figure 10B:
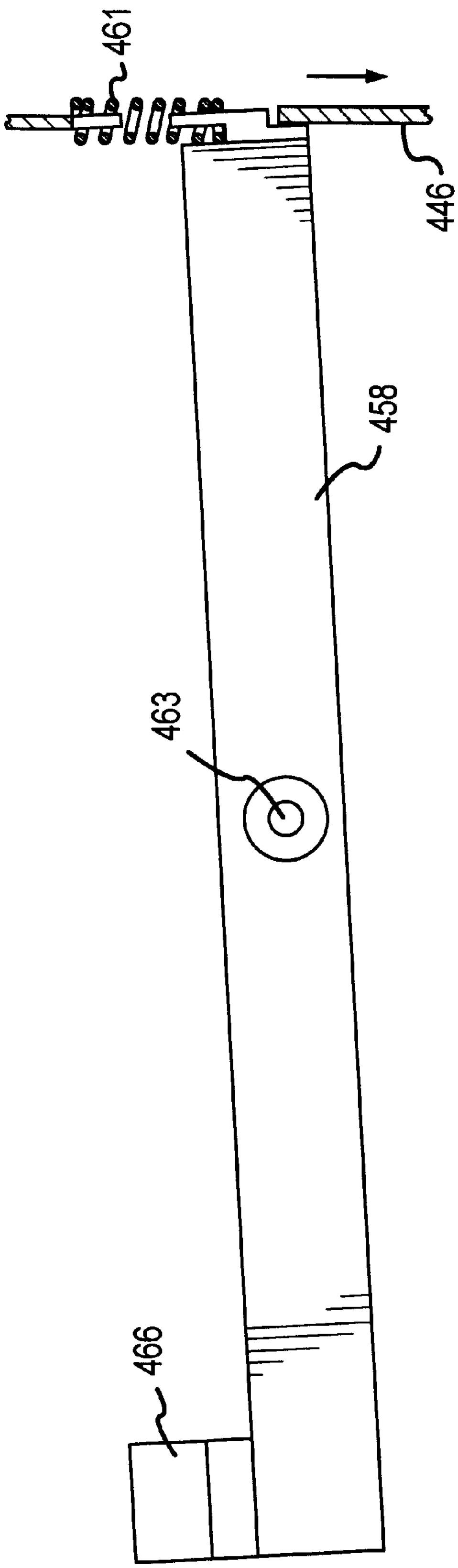
FIGS. 10B and 10C illustrate the operation of the operating lever of FIG. 10A.
Figure 10C:
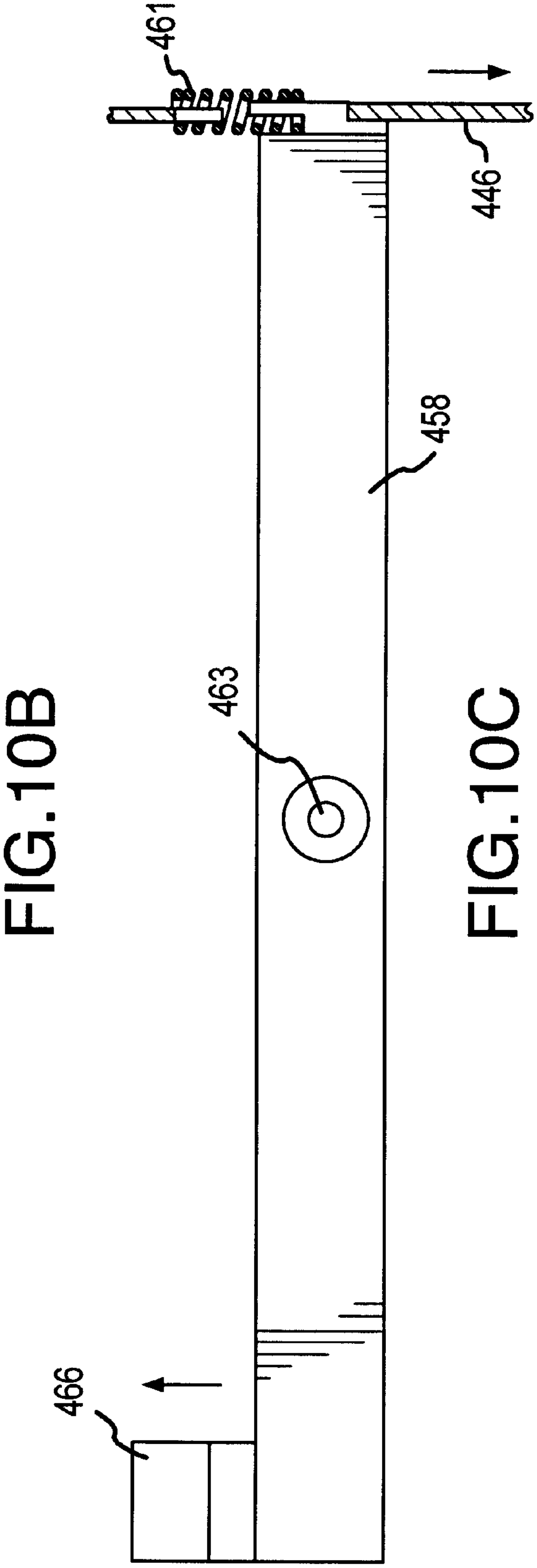

Referring also to FIGS. 10 and 10A, bars 444 and 446 operate rocker levers 458 which are pivoted to tubes 404 at pivot points 463 to move welding elements 466 against anvil plates 436 of adjacent tubes 404. It will be noted that in FIGS. 7A and 7B that the outermost welding elements 466 in the furthest left and furthest right assembly 406 are omitted since they are not needed. As shown in FIGS. 10A–10C, springs 461 are disposed between bars 446 and levers 458. When bars 444 and 446 are moved, levers 458 are pivoted about pivot points 463 to move welding elements 466 against anvil plates 436 (see FIG. 10C) under a pressure determined by springs 461. In this manner, adjacent fabric tubes on adjacent assemblies 406 may be welded together to form a two-dimensional array of pockets for receiving springs, e.g., forming welds 8A as shown in FIG. 2. In this way, a fabric quilt 464 (see FIG. 12) within which the pockets are included may be constructed in situ rather than pre-fabricating individual strings of spring assemblies.

Figure 10D:
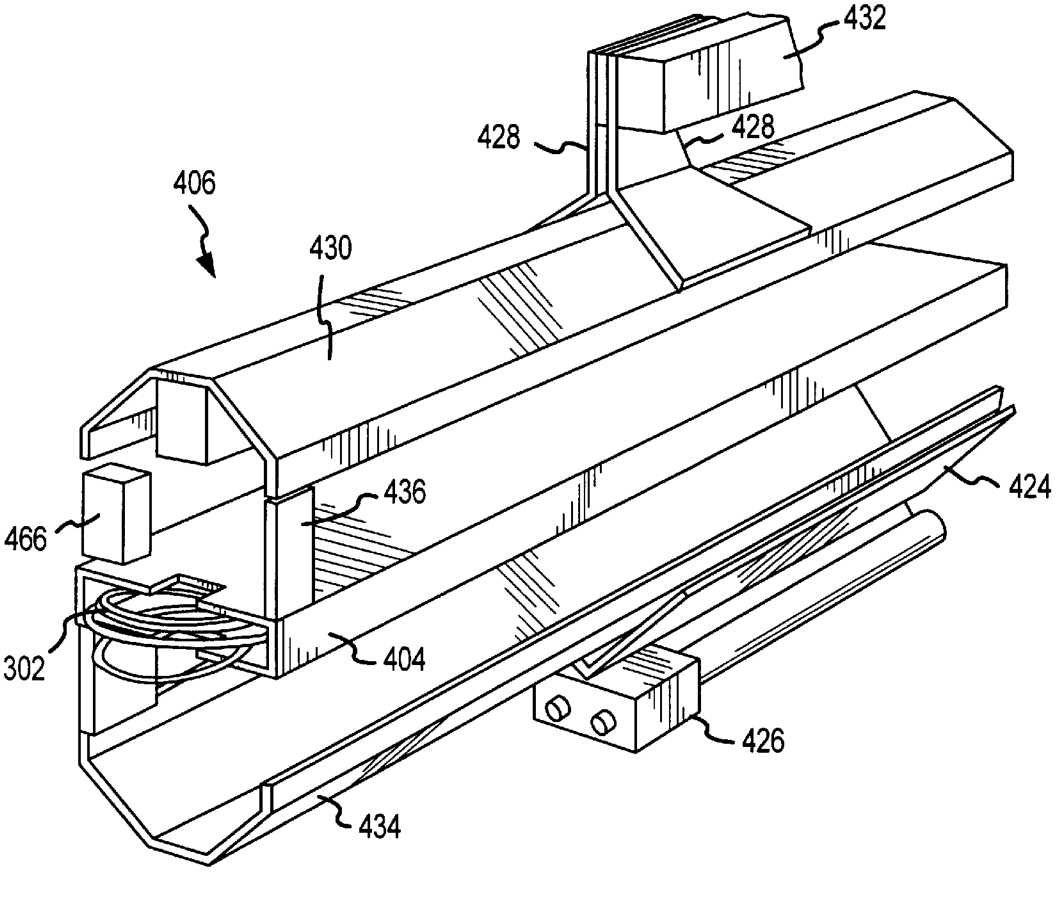
FIGS. 10D and 10E illustrate a simplified view of the fabric tube forming assembly of FIG. 10 showing the passage of a spring through a central channel.
Figure 10E:
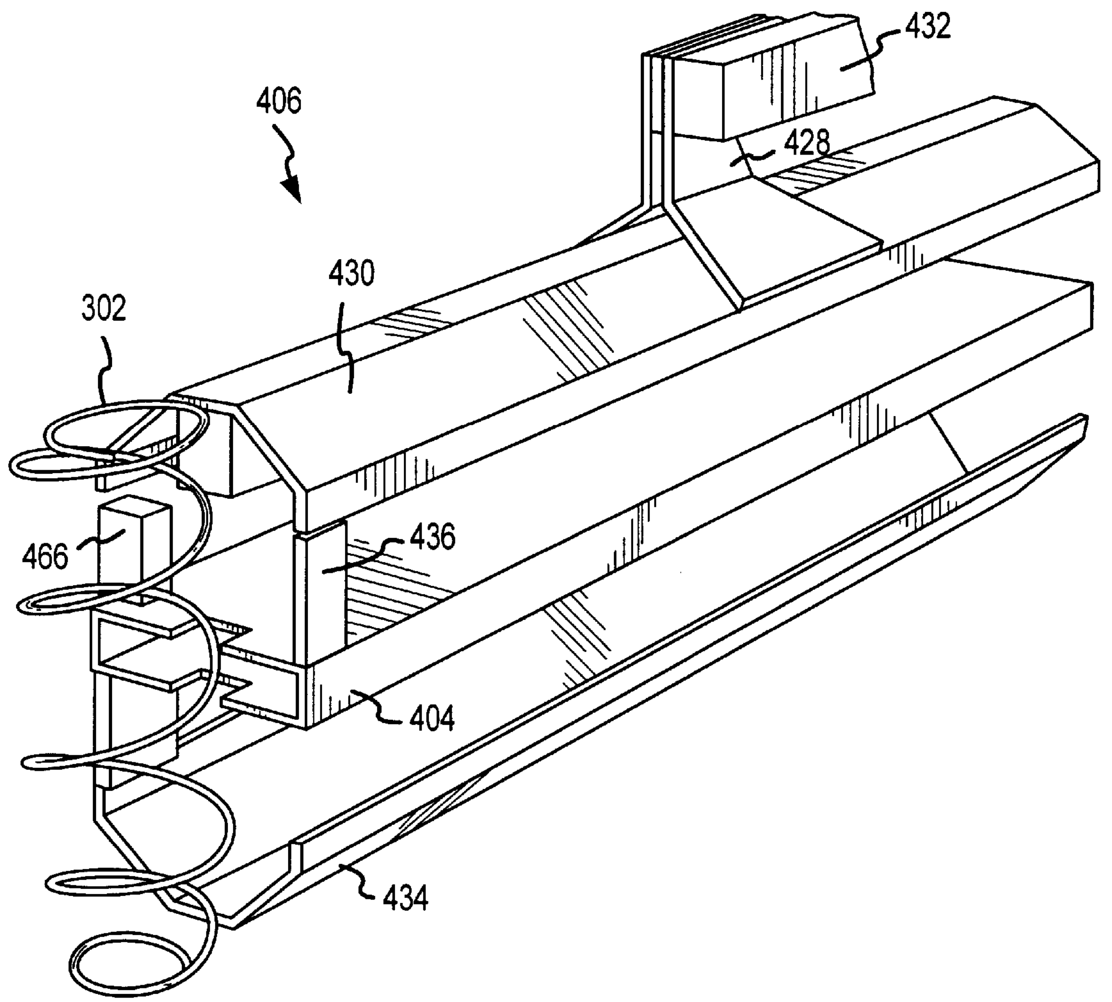

FIGS. 10D and 10E are fragmentary views of one assembly 406 illustrating the ejection of spring 302. As previously described in connection with FIGS. 4H and 4I, duckbills 332 force spring 302 out of tube 404. FIG. 10D illustrates spring 302 as it begins to exit tube 404, and FIG. 10E illustrates spring 302 when fully expanded. In operation, spring 302 is ejected into one of the fabric tubes formed from web 220 after a transverse weld has been created in the fabric tube as described hereinafter.

Figure 11:
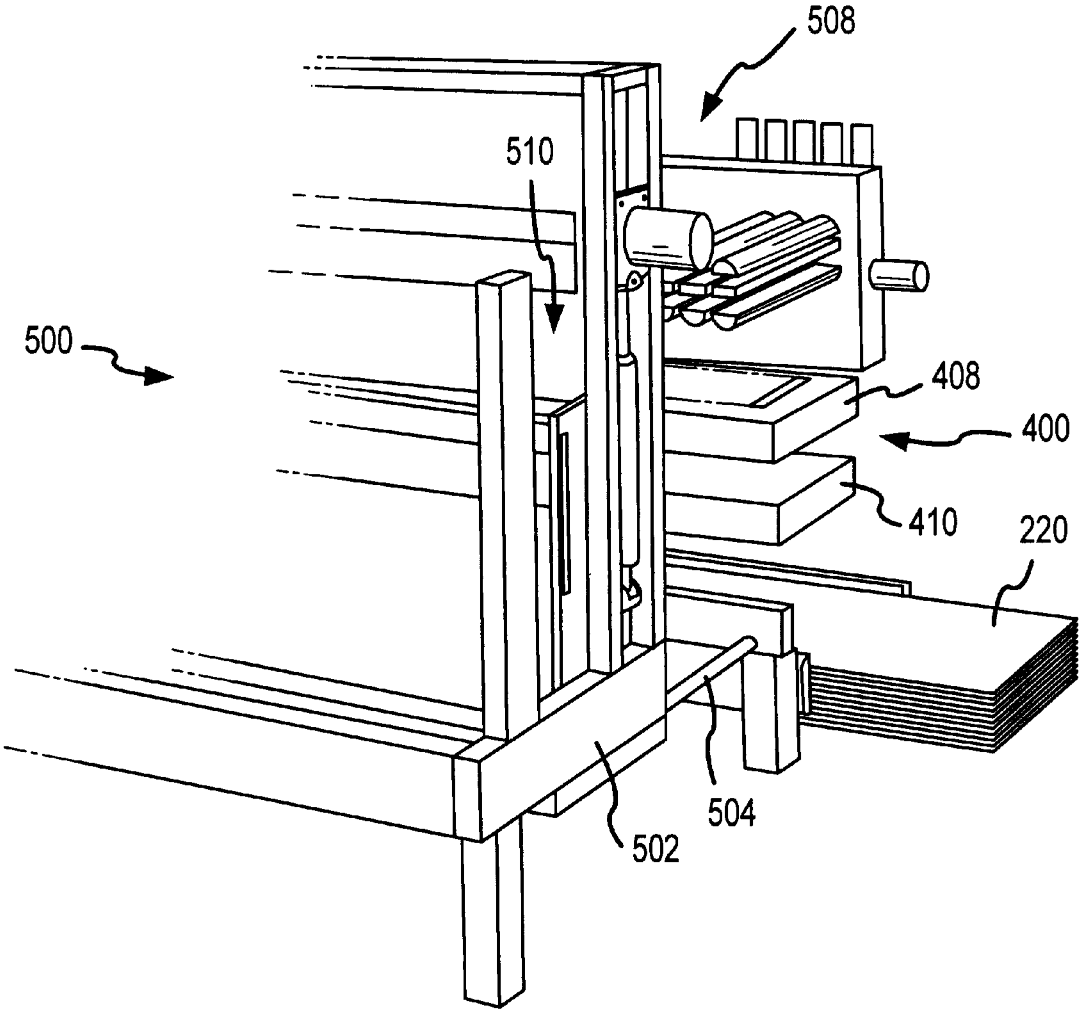
FIG. 11 is a perspective view of part of a pulling and spring pocketing zone of the apparatus of FIG. 3.
Figure 11B:
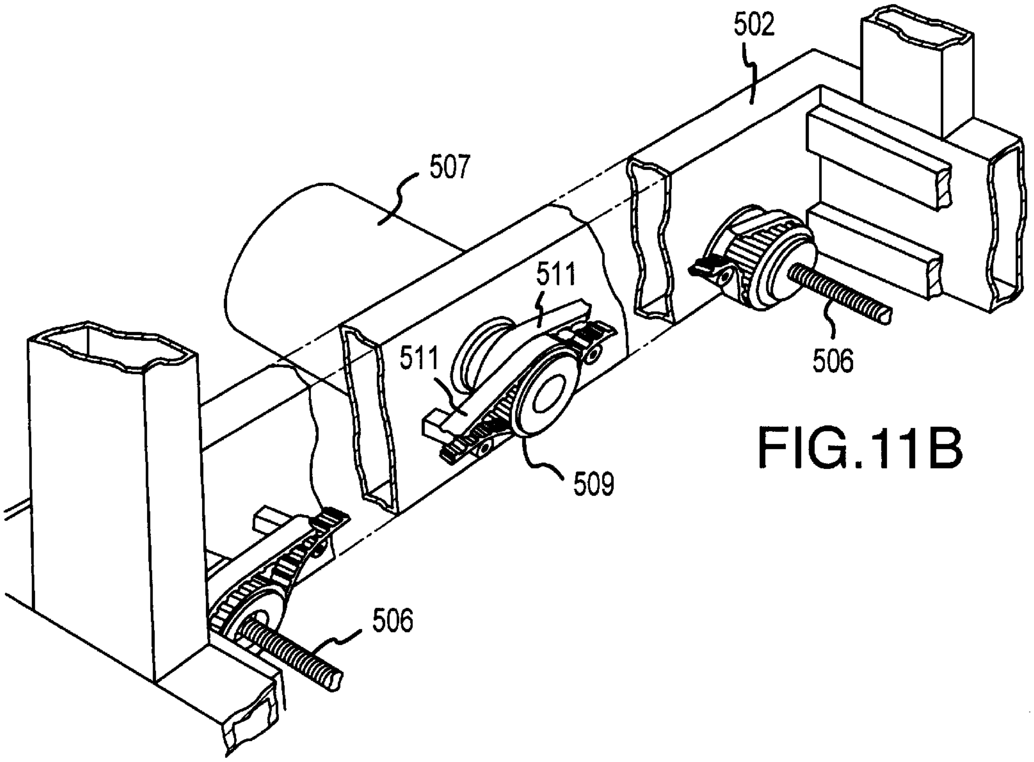
FIG. 11B is a perspective view of a drive motor and toothed belt drive arrangement for driving the lead screw drive mechanism of FIG. 11A.
Figure 11A:
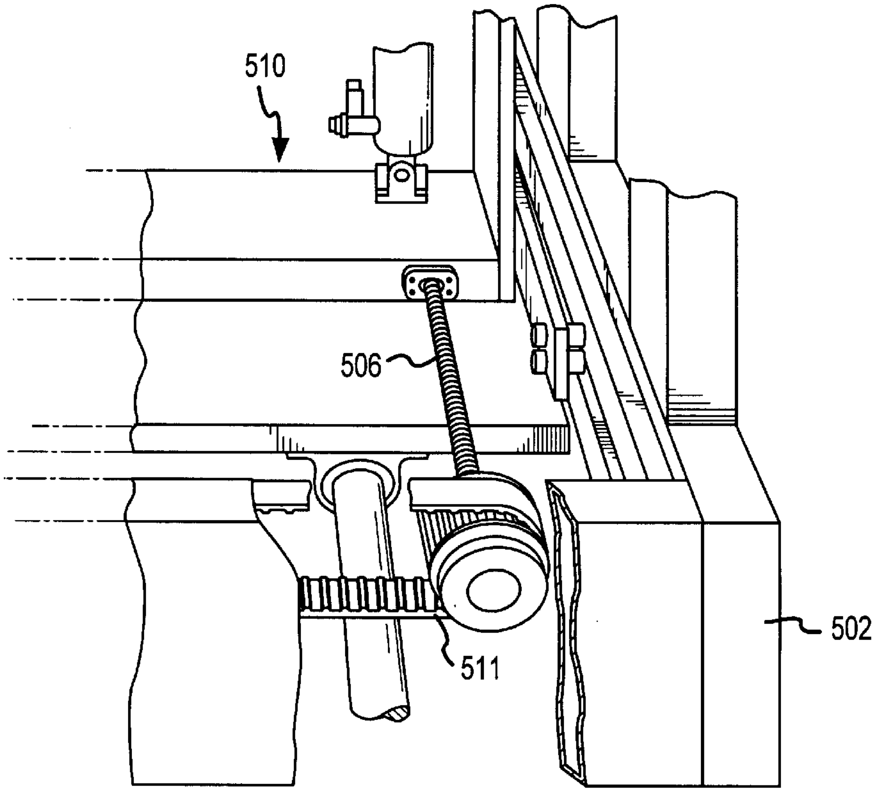
FIG. 11A is a perspective view of a lead screw drive mechanism for moving a row puller carriage in the pulling zone of FIG. 11.

FIG. 11 is a view of one end of pulling and spring pocketing zone 500. Zone 500 comprises a chassis 502 which is normally located just in front of zone 400, but can be moved forwards on slide bars 504 to permit access to zone 400. Zone 500 further comprises a spring pocketing assembly 508 and a quilt puller assembly 510. As shown in FIGS. 11A and 11B lead screws 506 are employed to move puller assembly 510 forward and rearward. A drive motor 507 having a toothed belt drive 509 is operated to turn belts 511 which cause lead screws 506 to rotate. Depending on the direction of rotation of motor 507, quilt puller assembly 510 is moved forward or rearward. An exemplary motor that may be used is a servomotor, commercially available from Omron.

Figure 12:
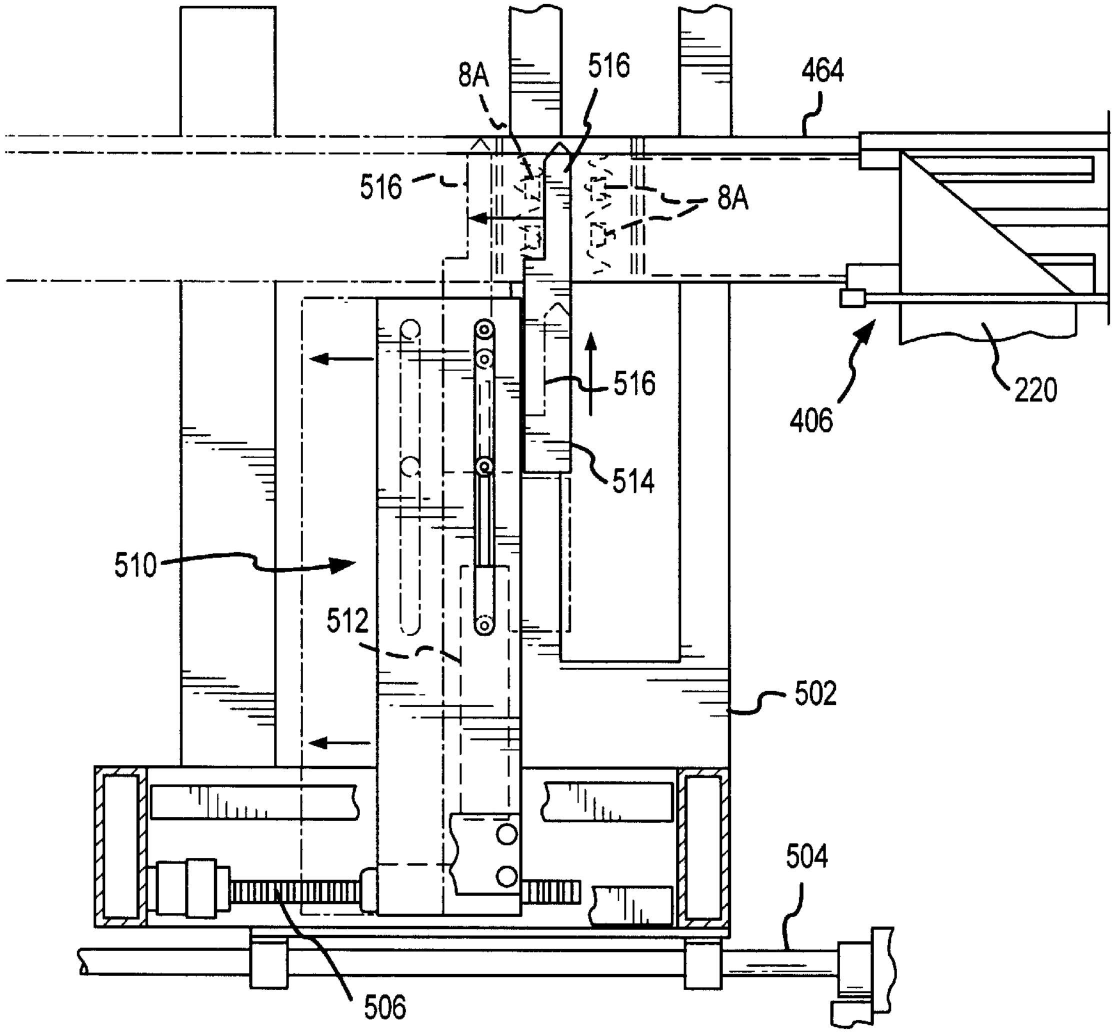
FIG. 12 is a side view of pulling elements of FIG. 11, illustrating a pulling cycle.

Referring to FIG. 12, quilt puller assembly 510 comprises actuators 512 which raise and lower a cross member 514 carrying puller elements 516 which are moved upwardly by actuators 512 into slots occurring between successive welds 8A formed by welding elements 466. In this way, when lead screws 506 are rotated, puller elements 516 are moved forward (as shown in phantom line) to engage welds 8A and thereby pull a formed mattress assembly forward onto table 202 (see FIG. 3). At the same time, puller elements 516 pull forward a quilt 464 (of connected fabric tubes) formed on assemblies 406, and pull up folded fabric webs 220 fed by assembly 410 (see FIG. 6). After moving forward, elements 516 are retracted downwardly, and puller assembly 510 is moved to its starting position.

Quilt puller assembly 410 may also be connected to structures 454 and/or 468 (see FIG. 5) so that, during a pulling operation, welding elements 460 and/or 466 may be maintained clamped against their associated anvils and travel with quilt 464 formed on forming assemblies 406. This provides a more even pulling action and further relieves any stress on the welds. If welding elements 466 are movable, anvil plates 438 and levers 458 should be supported on structure connected to structure 468 rather than directly connected to tubes 404. In like manner, spring pocketing assembly 408 may be connected to move with puller assembly 410 so as to further distribute the pulling forces and avoid stress on welds formed by pocketing assembly 508 as described below. Indeed, by pulling with the welding elements clamped against the anvils, it may be possible to dispense with the use of separate puller elements 516. It will be understood that in arrangements in which the welding elements and anvils travel during the pulling stroke, the elements and anvils are not released after a welding operation until after the pulling stroke is completed. If these elements do not travel, they must be released prior to the pulling stroke.

Spring pocketing assembly 508 (see FIGS. 13, 13A, 13B, 14A, 14B and 15) which may be mounted on chassis 502, to travel with the pulling assembly 510, comprises actuators 520 which raise and lower a cross member 522. Coupled to cross member 522 are laterally extending actuator bars 524 and 526 which carry downwardly extending fingers 528 and 530, respectively. Fingers 528 carry welding elements 532 and fingers 530 carry anvils 534 as best seen in FIGS. 14A and 14B. Bars 524 and 526 are actuated by actuators 536 and 538 to move elements 532 and anvils 534 between the positions shown in FIGS. 14A and 14B. In FIG. 14A, elements 532 and anvils 534 extend downwardly through slots between successive welds 8A (see FIGS. 13A and 13B) between tubes in quilt 464 formed on assemblies 406. In FIG. 13B, elements 532 and anvils 534 clamp the tubes in quilt 464 and form welds 16 (shown in phantom line in FIGS. 13A and 13B). Welds 16 may be either vertically spaced welds as shown in FIG. 2, or as single continuous welds extending through a horizontal center plane of quilt 464.

Figure 13:
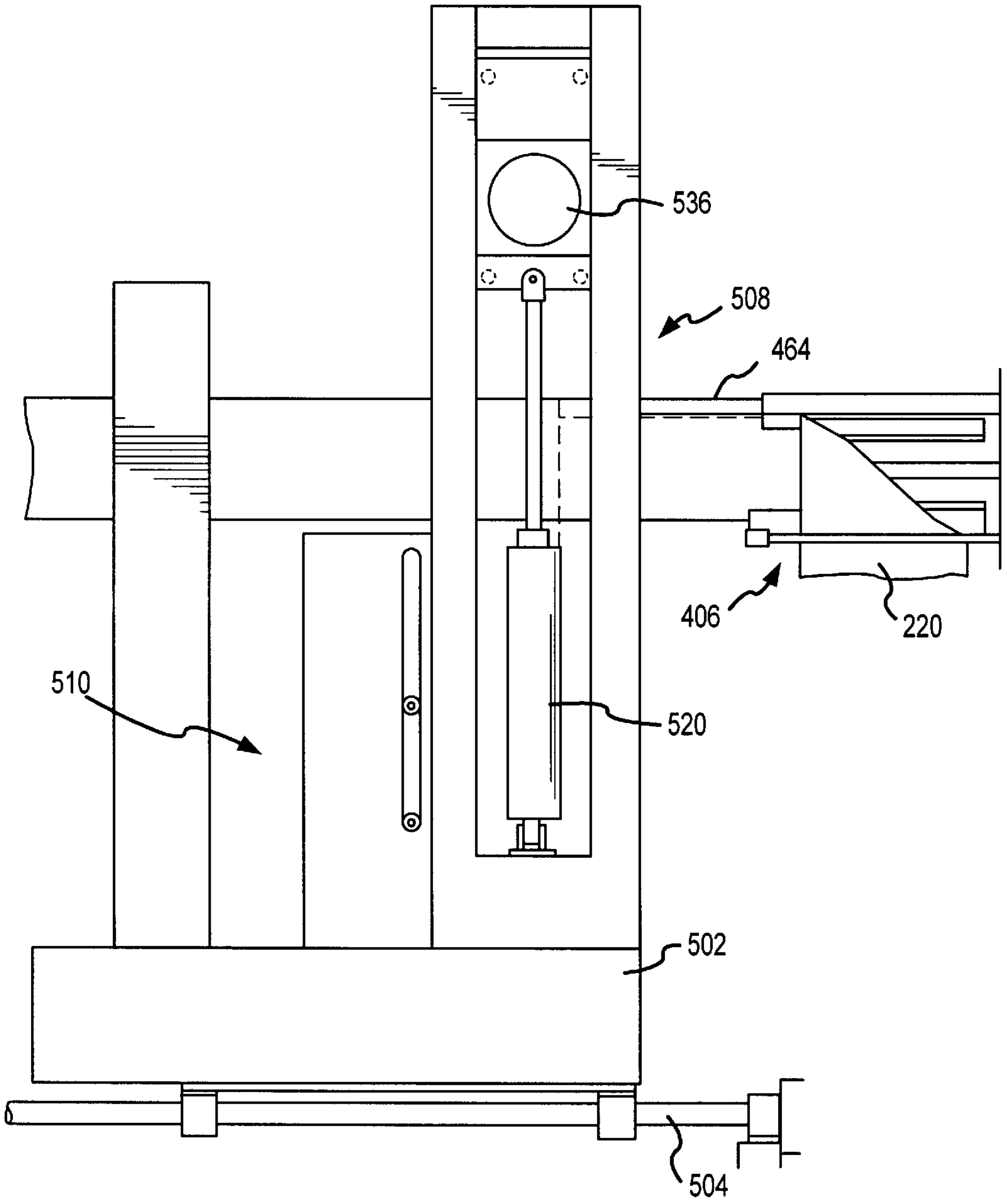
FIG. 13 is a side view of the pulling and spring pocketing zone of FIG. 11.
Figure 13A:
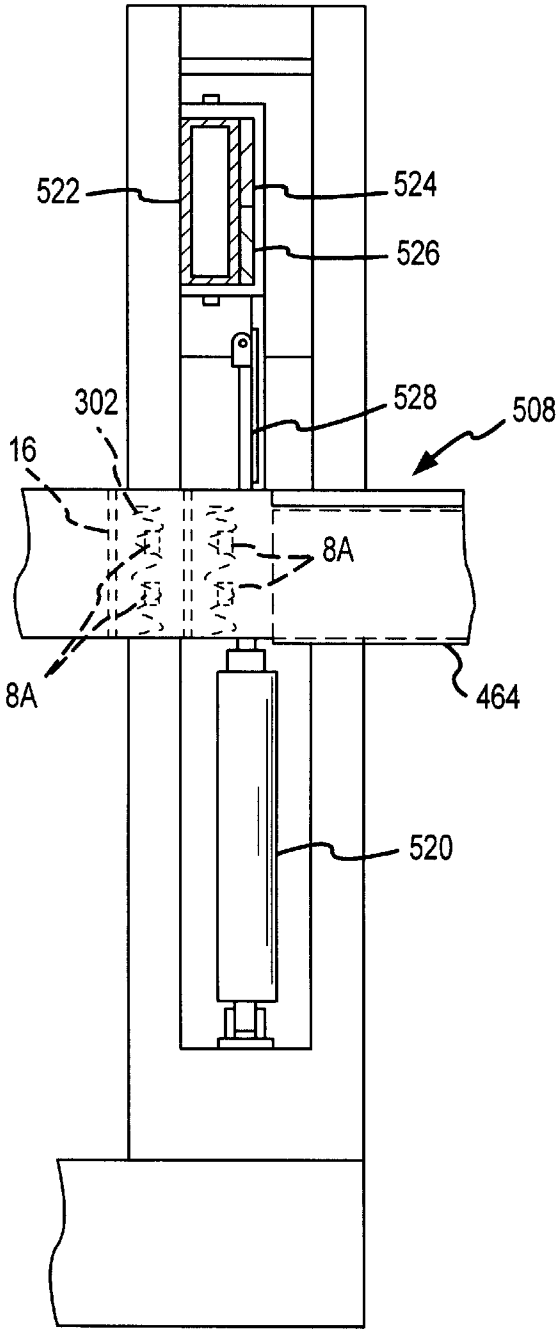
FIGS. 13A and 13B are cross-sectional side views of FIG. 13 showing pocket welding elements.
Figure 13B:
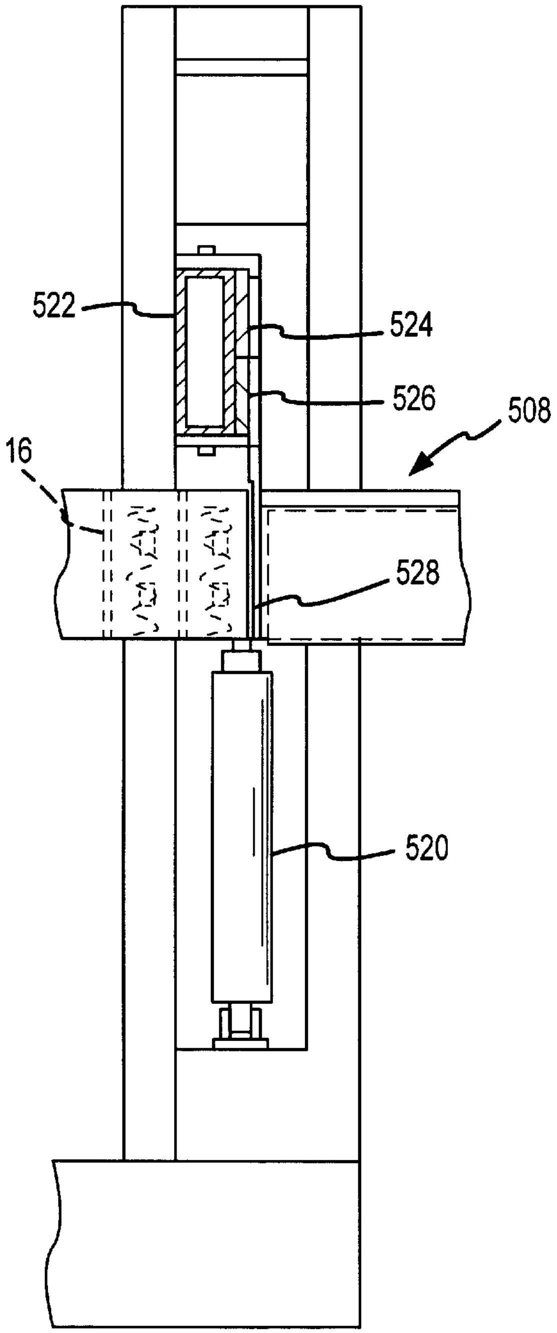
Figure 14A:
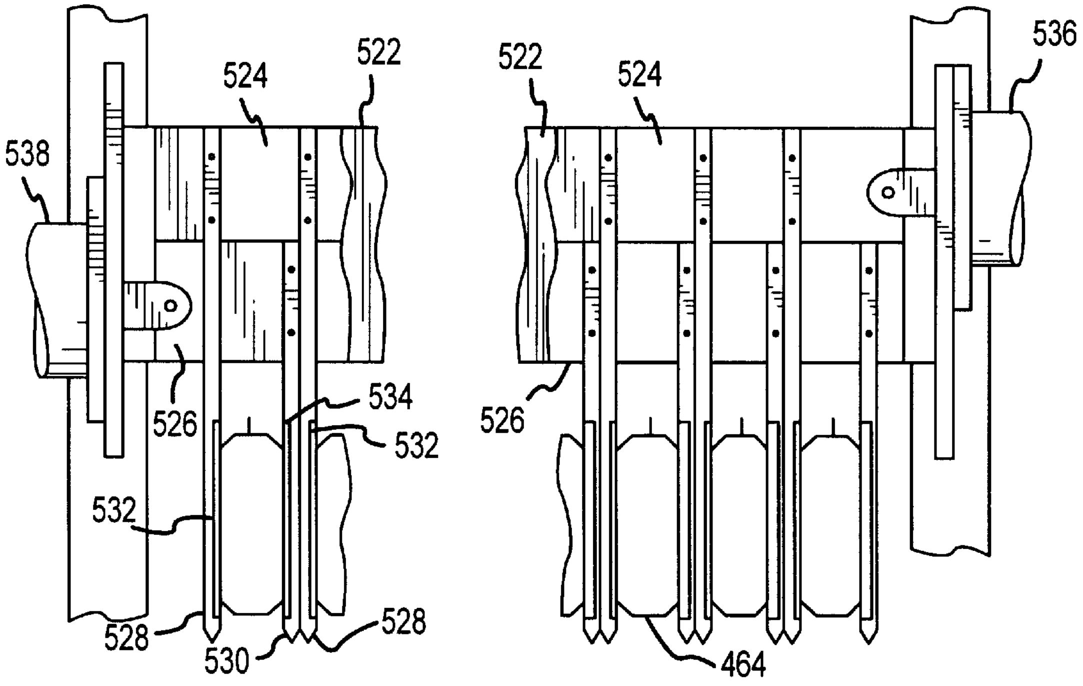
FIGS. 14A and 14B are fragmentary frontal views illustrating the operation of the pocket welding elements.
Figure 14B:
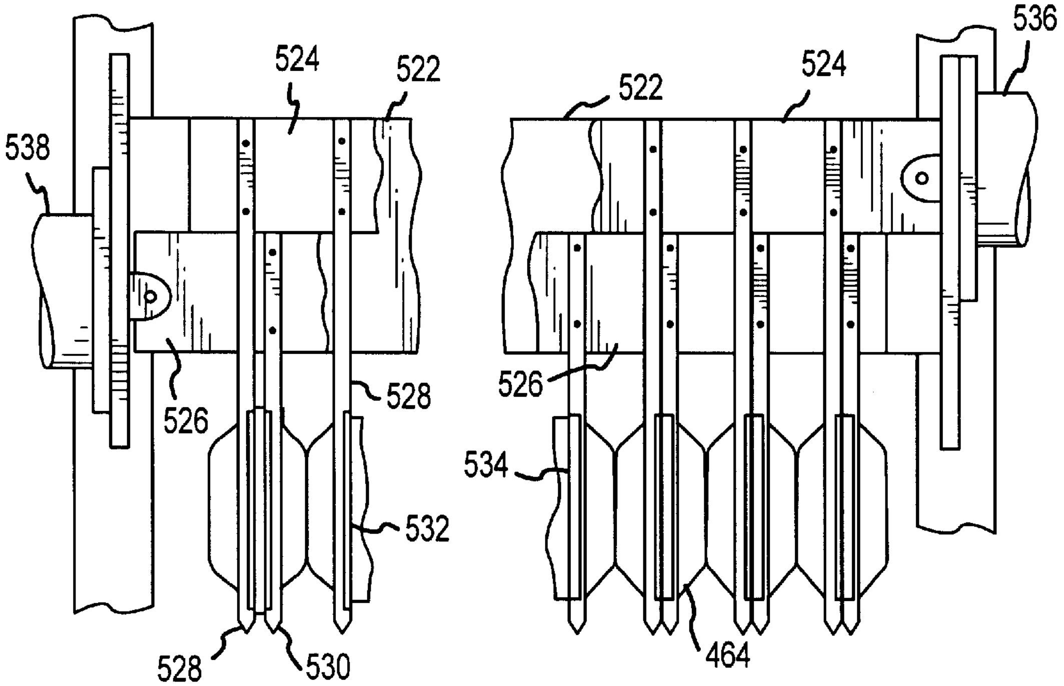
Figure 15:
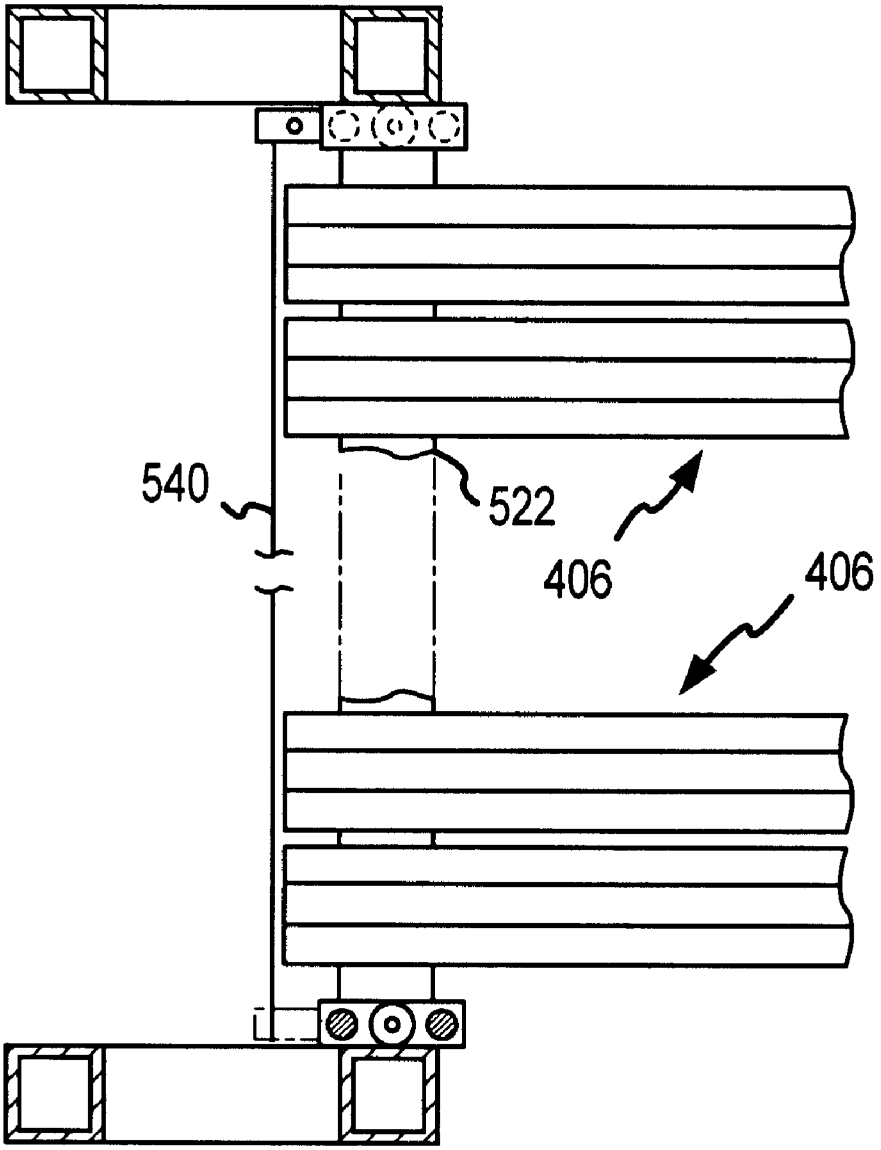
FIG. 15 is a simplified fragmentary cut-away plan view of the pulling and spring pocketing zone showing elements used to sever a completed spring assembly.
Figure 15A:
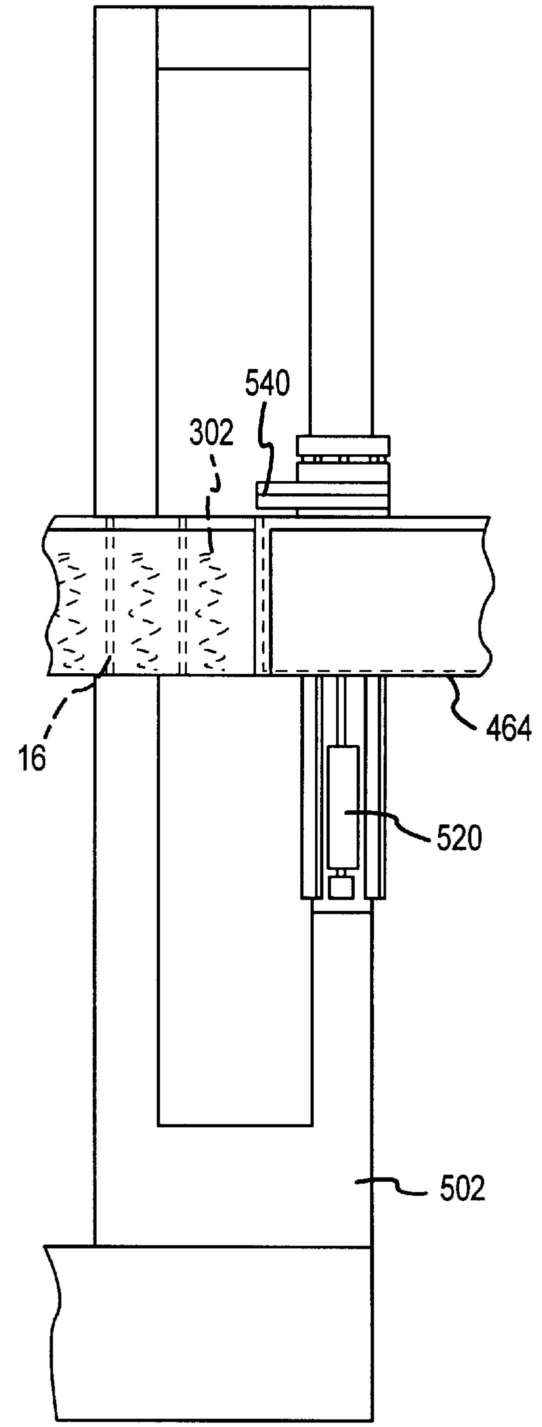
FIG. 15A is a cross-sectional view of the pulling and spring zone of FIG. 15.

Actuators 520 raise cross member 522 and connected elements 532 and anvils 534 clear of quilt 464 during return motion of carriage 502 (see FIG. 13A). Welds 16 define pockets for successive springs that are discharged from the tubes 404 as best shown in FIGS. 13A and 13B. As shown in FIGS. 15 and 15A, cross member 522 also caries a cutting wire 540, which may be activated to sever a spring assembly when it has reached a sufficient length (e.g., when it has sufficient rows of springs) and has been transferred to table 202. The severance will typically be made after a cycle in which no springs are delivered from the conveyor, so as to produce an empty length of quilt through which the cut may be made.

Spring assembly forming apparatus 200 is preferably operated using one or more controllers which control the various actuators, lead screw motors, heating elements, and other movable parts. Preferably, the controller is programmed so that apparatus 200 operates in cycles where rows of springs are inserted into the quilt as the quilt is being formed on assemblies 406. In this way, a two-dimensional spring assembly is formed in situ. Exemplary controllers which may be employed to control the various operations of apparatus 200 are PLC controllers, such as Mitsubishi FX series controllers, commercially available from Mitsubishi, and having a Quick Panel touch screen available from TCP.

In operation, fabric webs 220 are initially loaded onto assemblies 406. A first row of springs are also loaded into tubes 404 utilizing the equipment in spring feed zone 300 as described in connection with FIGS. 4A-4I. Bars 440 and 442 are moved to clamp the free ends of webs 220 between welding elements 460 and anvils 462 as shown in FIG. 7B. Thermal welds are then produced to form webs 220 into fabric tubes which are disposed about assemblies 406. At the same time, cross bar 522 is lowered and elements 532 and anvils 534 are closed around webs 220 as shown in FIG. 14B. In this way, a transverse weld 16 is produced in each fabric tube to form one end of a pocket. While this transverse weld is being produced, welding elements 466 are moved against anvils 436 as shown in FIG. 7B to produce cross welds 8A between adjacent fabric tubes. In this manner, quilt 464 (see FIG. 12) is produced in situ on assemblies 406. Once the welds have set, all welding elements are released, and pulling assembly 510 is employed to pull quilt 464 forward over assemblies as shown in FIG. 12. Alternatively, the welding elements themselves may be employed to pull quilt 464 forward as previously described.

At this point, a row of springs 302 are ejected out of tubes 404 (see FIGS. 10D and 10E) into the row of half formed pockets in quilt 464. At this point, one full cycle has been completed. This cycle is repeated as many times as desired depending on the desired length of the spring assembly. More specifically, cross bar 522 is again lowered and elements 532 and anvils 534 are closed about each fabric tube to form a transverse weld 16 behind each spring to enclose the spring in a pocket. Also formed are the longitudinal welds, the cross welds, and another row of springs are introduced into tubes 404. The springs are ejected into a second row of pockets after quilt 464 has been advanced over assemblies 406. Once a desired length has been reached, cutting wire 540 is lowered to sever the completed spring assembly from the quilt remaining on assemblies 406 as shown in FIG. 15.

The various welding elements are preferably electrically heated wires. Such wires are preferred because of their relatively small cost and size. Thermal welds are also advantageous because, if the welds are formed well before the quilt is pulled, ample time is available for the welds to set before they are subjected to any stress. If the welding elements and anvils remain clamped during the pulling stroke, the welds have still further opportunity to set before being exposed to stress.

Welds 8A and 16 are sufficiently vertically spaced such that their upper and lower extremities are well above and below a center line of the mattress assembly and of the quilt from which it is formed. This provides symmetrical support for the springs and inhibits possible interference between the springs due to inadequate lateral support. In order to provide the most effective welding, without undue weakening of the fabric, it is preferred to utilize a composite non-woven fabric formed of fibers of two different synthetic plastic resins, which will bond together, but one of which fuses at a considerably higher temperature than the other. For example, such synthetic plastic resins can include polyethylene, polypropylene, polyester, and the like. Alternatively, the fibers themselves may be composite, with a lower fusing outer layer which bonds the fibers and a higher fusing core. Such materials can include, for example, polyethylene and polyester (with either material being either on the outside or inside). The welding elements are energized so as to fuse only the lower melting component or layer.

One important advantage of the invention is that springs which are constructed from tempered steel may be used. The use of tempered coils is advantageous in that tempered coils make the spring unit more resilient and provide a much longer life to the spring unit. Also, tempering allows the manufacturer to use less wire while achieving a better coil. Further, tempering provides cost savings because lower tensile wire may be used. When non-tempered wire is used, the manufacturer is generally required to include more turns of wire in a coil. As such, the coil must be inserted under pressure into the pocket so that the coil will hold its original height.

The invention has now been described in detail for purposes of clarity of understanding. However, it will be appreciated that certain changes and modifications may be practiced within the scope of the appended claims.

What is claimed is:

1. A pocket spring assembly, comprising:

a plurality of elongate fabric tubes disposed adjacent each other, wherein the fabric tubes are constructed of a heat fusible material, wherein each fabric tube has a plurality of pockets, and wherein at least some of the pockets of adjacent fabric tubes are directly welded together at midpoints on the adjacent pockets to fuse the adjacent pockets together; and a spring disposed in each of the pockets.

2. An assembly as in claim 1, wherein each fabric tube has a longitudinal axis, wherein each spring has a central axis about which the spring is coiled, and wherein the central axis of each spring is generally perpendicular to the longitudinal axis of the fabric tube.

3. An assembly as in claim 2, wherein each fabric tube includes a plurality of closed segments which are spaced apart from each other to form the pockets.

4. An assembly as in claim 3, wherein the closed segments comprise welds which are generally perpendicular to the longitudinal axis of the fabric tubes.

5. A mattress comprising:

a pocket spring assembly comprising a plurality of elongate fabric tubes disposed adjacent each other, wherein the fabric tubes are constructed of a heat fusible material, wherein each fabric tube has a plurality of pockets, and wherein at least some of the pockets of adjacent fabric tubes are directly welded together at midpoints on the adjacent pockets to fuse the adjacent pockets together, and a spring disposed in each of the pockets;

at least one layer of padding material disposed on a top side of the spring assembly; and a fabric cover over the spring assembly and the layer of padding material.

6. A pocket spring assembly, comprising:

a plurality of elongate fabric tubes disposed adjacent each other, wherein the fabric tubes are constructed of a heat fusible material, wherein each fabric tube has a linear array of pockets, and wherein at least some of the pockets of adjacent fabric tubes are directly welded together at midpoints on the adjacent pockets to fuse the adjacent pockets together; and a spring disposed in each of the pockets.

7. A pocket spring assembly, comprising:

a plurality of elongate fabric tubes disposed adjacent each other, wherein the fabric tubes are constructed of a heat fusible material, wherein each fabric tube forms a plurality of pockets, and wherein at least some of the pockets of adjacent fabric tubes are directly welded together at midpoints on the adjacent pockets to fuse the adjacent pockets together; and a spring disposed in each of the pockets.

8. A pocket spring assembly, comprising:

a plurality of elongate fabric tubes disposed adjacent each other, wherein the fabric tubes are constructed of a heat fusible material, wherein each fabric tube has a plurality of pockets that are formed by connecting the tube to itself at spaced apart locations, and wherein at least some of the pockets of adjacent fabric tubes are directly welded together at midpoints on the adjacent pockets to fuse the adjacent pockets together; and a spring disposed in each of the pockets.

* * * * *